(12) United States Patent
Nakamura et al.

(10) Patent No.: US 12,130,481 B2
(45) Date of Patent: Oct. 29, 2024

(54) LIGHT EMITTING DEVICE

(71) Applicant: Panasonic Intellectual Property Management Co., Ltd., Osaka (JP)

(72) Inventors: Kazuki Nakamura, Osaka (JP); Yasuhisa Inada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 206 days.

(21) Appl. No.: 17/556,715

(22) Filed: Dec. 20, 2021

(65) Prior Publication Data

US 2022/0113482 A1  Apr. 14, 2022

Related U.S. Application Data

(63) Continuation of application No. PCT/JP2020/024747, filed on Jun. 24, 2020.

(30) Foreign Application Priority Data

Aug. 1, 2019  (JP) ................................. 2019-142103

(51) Int. Cl.
*G01S 7/481* (2006.01)
*G01S 17/42* (2006.01)
(Continued)

(52) U.S. Cl.
CPC .......... *G02B 6/4214* (2013.01); *G01S 7/4817* (2013.01); *G01S 17/42* (2013.01);
(Continued)

(58) Field of Classification Search
CPC .... G02F 1/2955; G02F 1/295; G02F 2203/24; G02B 6/4214; G02B 6/12;
(Continued)

(56) References Cited

U.S. PATENT DOCUMENTS 5,687,018 A * 11/1997 Funaki ................. H04B 10/564
                                                    398/209
6,334,004 B1 * 12/2001 Ohkuma ............... G02F 1/0123
                                                    385/9

(Continued)

FOREIGN PATENT DOCUMENTS

JP         7-318985         12/1995
JP         9-225670          9/1997
(Continued)

OTHER PUBLICATIONS

Hashiya et al., Machine Translation of WO-2018061514-A1, Apr. 2018. (Year: 2018).*

(Continued)

*Primary Examiner* — Michelle R Connelly
(74) *Attorney, Agent, or Firm* — Rimon P.C.

(57) ABSTRACT

A light emitting device includes a waveguide element including a first mirror that is light transmissive, a second mirror that faces the first mirror, and an optical waveguide layer located between the first mirror and the second mirror, the waveguide element allowing light input to the optical waveguide layer to propagate along a first direction and to be emitted through the first mirror; a first photodetector that is located on a path of light to be input to the optical waveguide layer or on another path branching off from the path and outputs a first signal according to an amount of received light; and a second photodetector that is located on a path of light that has propagated through the optical waveguide layer along the first direction and passed the optical waveguide layer and outputs a second signal according to an amount of received light.

10 Claims, 25 Drawing Sheets

(51) Int. Cl.
*G02B 6/12* (2006.01)
*G02B 6/122* (2006.01)
*G02B 6/125* (2006.01)
*G02B 6/34* (2006.01)
*G02B 6/42* (2006.01)
*G02F 1/295* (2006.01)

(52) U.S. Cl.
CPC .......... *G02B 6/12* (2013.01); *G02B 6/12004* (2013.01); *G02B 6/122* (2013.01); *G02B 6/125* (2013.01); *G02B 6/34* (2013.01); *G02B 2006/12104* (2013.01)

(58) Field of Classification Search
CPC .... G02B 6/12004; G02B 6/122; G02B 6/125; G02B 6/34; G02B 2006/12104; G01S 7/4817; G01S 17/42
See application file for complete search history.

(56) References Cited

U.S. PATENT DOCUMENTS

| | | | | |
|---|---|---|---|---|
| 9,880,443 | B2* | 1/2018 | Anderson | G02F 1/29 |
| 10,613,276 | B2* | 4/2020 | Mansouri Rad | G01S 17/06 |
| 10,656,498 | B2* | 5/2020 | Kim | G01S 7/4814 |
| 2006/0083144 | A1* | 4/2006 | Piede | G02F 1/025 |
| | | | | 369/100 |
| 2008/0013587 | A1* | 1/2008 | Tempea | H01S 3/1112 |
| | | | | 359/584 |
| 2008/0212621 | A1 | 9/2008 | Furuya et al. | |
| 2009/0244685 | A1* | 10/2009 | Hoshida | H04B 10/50575 |
| | | | | 359/279 |
| 2015/0263477 | A1 | 9/2015 | Onaka | |
| 2018/0010967 | A1* | 1/2018 | Seeley | H01S 5/143 |
| 2018/0224709 | A1 | 8/2018 | Inada et al. | |
| 2019/0004393 | A1 | 1/2019 | Hashiya et al. | |
| 2019/0379453 | A1* | 12/2019 | Toda | H04B 10/07955 |
| 2020/0003873 | A1 | 1/2020 | Nagao et al. | |

FOREIGN PATENT DOCUMENTS

| | | | | |
|---|---|---|---|---|
| JP | 2008-209909 | | 9/2008 | |
| JP | 2013-016591 | | 1/2013 | |
| WO | 2014/091614 | | 6/2014 | |
| WO | 2015/118829 | | 8/2015 | |
| WO | 2018/061514 | | 4/2018 | |
| WO | WO-2018061514 | A1 * | 4/2018 | .......... G01R 31/006 |
| WO | 2018/193723 | | 10/2018 | |

OTHER PUBLICATIONS

International Search Report of PCT application No. PCT/JP2020/024747 dated Aug. 4, 2020.

* cited by examiner

LIGHT EMITTING DEVICE

BACKGROUND

1. Technical Field

The present disclosure relates to a light emitting device.

2. Description of the Related Art

Conventionally, various devices that can change a light emission direction have been proposed.

Japanese Unexamined Patent Application Publication No. 2013-16591 (hereinafter referred to as Patent Literature 1) discloses a light deflection element that includes a waveguide including an optical waveguide layer and a first distributed bragg reflector provided on an upper surface and a lower surface of the optical waveguide layer, a light incidence opening through which light is incident into the waveguide, and a light emission opening provided in a surface of the waveguide. Patent Literature 1 describes that light can be changed over a wide deflection angle range by changing a wavelength of incident light.

U.S. Patent Application Publication No. 2018/224709 (hereinafter referred to as Patent Literature 2) discloses a waveguide element that includes two multi-layer reflection films and an optical waveguide layer provided between the two multi-layer reflection films. An angle of light emitted from the multi-layer reflection films can be changed by changing a refractive index or a thickness of the optical waveguide layer. Such a waveguide is called a "slow-light waveguide".

International Publication No. 2018/061514 (hereinafter referred to as Patent Literature 3) discloses a light scan device that includes a total reflection waveguide and a slow-light waveguide connected to the total reflection waveguide.

SUMMARY

One non-limiting and exemplary embodiment provides a technique for improving emission characteristics of a light emitting device that can change a light emission direction.

In one general aspect, the techniques disclosed here feature a light emitting device including: a waveguide element including a first mirror that is light transmissive, a second mirror that faces the first mirror, and an optical waveguide layer located between the first mirror and the second mirror, the waveguide element allowing light input to the optical waveguide layer to propagate along a first direction and to be emitted through the first mirror; a first photodetector that is located on a path of light to be input to the optical waveguide layer or on another path branching off from the path and outputs a first signal according to an amount of received light; and a second photodetector that is located on a path of light that has propagated through the optical waveguide layer along the first direction and passed the optical waveguide layer and outputs a second signal according to an amount of received light.

It should be noted that general or specific embodiments of the present disclosure may be implemented as a device, a system, a method, or any combination thereof.

According to the aspect of the present disclosure, it is possible to improve emission characteristics of a light emitting device that can change a light emission direction.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
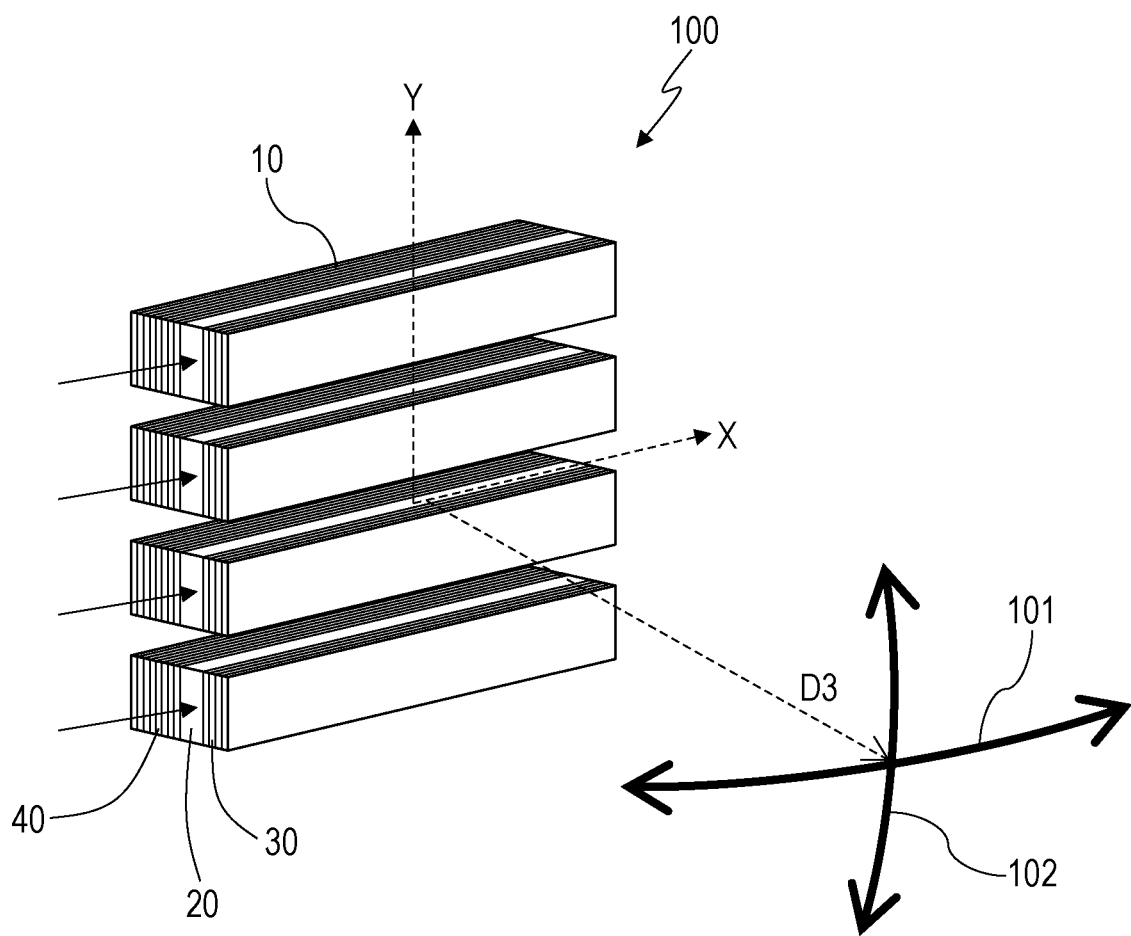
FIG. 1 is a perspective view schematically illustrating an example of a configuration of a light emitting device.

A light emitting device according to an exemplary embodiment of the present disclosure includes one or more waveguide elements each having a structure of a slow-light waveguide, as with the devices disclosed in Patent Literatures 2 and 3. The waveguide element includes a first mirror, which is light transmissive, a second mirror that faces the first mirror, and an optical waveguide layer located between the first mirror and the second mirror. The waveguide element allows light input to the optical waveguide layer to propagate along a first direction and to be emitted through the first mirror. A direction of the emitted light can be changed by adjusting a refractive index or a thickness of the optical waveguide layer or a wavelength of light input to the optical waveguide layer, as described later. More specifically, a component of a wave vector of the emitted light in a direction along a longitudinal direction of the optical waveguide layer can be changed by changing at least one of the refractive index, thickness, or wavelength. This can realize one-dimensional scan using light. The light emitting device may include a driving device that changes the refractive index or the thickness of the optical waveguide layer or the wavelength of propagating light.

Furthermore, two-dimensional scan can be realized in a case where an array of a plurality of waveguide elements is used. More specifically, a direction in which light beams emitted from the plurality of waveguide elements enhance each other can be changed by giving an appropriate phase difference to light supplied to the plurality of waveguide elements and adjusting the phase difference. A component of a wave vector of the emitted light in a direction crossing a direction along the longitudinal direction of the optical waveguide layer changes due to the change of the phase difference. This can realize two-dimensional scan.

A light emission direction may be changed by controlling any one of the refractive index, thickness, and wavelength or may be changed by controlling any two of or all of the refractive index, thickness, and wavelength.

In the present disclosure, "light" means not only visible light (having a wavelength of approximately 400 nm to approximately 700 nm), but also electromagnetic waves including an ultraviolet ray (having a wavelength of approximately 10 nm to approximately 400 nm) and an infrared ray (having a wavelength of approximately 700 nm to approximately 1 mm). Hereinafter, an ultraviolet ray is sometimes referred to as "ultraviolet light", and an infrared ray is sometimes referred to as "infrared light".

In the present disclosure, "scan" using light means changing a direction of light. The "one-dimensional scan" means linearly changing a direction of light along a direction crossing this direction. The "two-dimensional scan" means two-dimensionally changing a direction of light along a plane crossing this direction.

A light emitting device according to an embodiment of the present disclosure can be, for example, used in a light detection and ranging (LiDAR) system. The LiDAR system uses a short-wavelength electromagnetic wave (e.g., visible light, an infrared ray, or an ultraviolet ray) as compared with a radar system using a radio wave such as a millimeter wave. It is therefore possible to detect a distance distribution of an object at a high resolution. The LiDAR system can be mounted on a mobile body such as an automobile, an unmanned aerial vehicle (UAV, so-called drone) or an automated guided vehicle (AGV) and used as one of collision avoidance technologies.

Example of Configuration of Light Emitting Device

An example of a configuration and a principle of a light emitting device that can perform two-dimensional scan are described below as an example. In the following description, detailed description more than necessary may be omitted. For example, detailed description of a well-known matter and repeated description of a substantially identical configuration may be omitted. This is to avoid unnecessary redundancy of the following description and facilitate understanding of a person skilled in the art. The inventors provide the attached drawings and the following description in order to make a person skilled in the art fully understand the present disclosure, and do not intend to limit the subject matters described in the claims to these. In the following description, identical or similar constituent elements are given identical reference signs. In the following description, XYZ coordinates indicative of X, Y, and Z directions orthogonal to one another are used. A direction of a structure illustrated in the drawings is set in consideration of easy understanding of description and does not limit a direction in actual implementation of the embodiment of the present disclosure. Furthermore, a shape and a size of a whole structure of a part of the structure illustrated in the drawings do not limit actual shape and size.

FIG. 1 is a perspective view schematically illustrating an example of a configuration of a light emitting device. A light emitting device 100 illustrated in FIG. 1 includes a waveguide array including a plurality of waveguide elements 10. Each of the plurality of waveguide elements 10 has a shape extending in a first direction (X direction in FIG. 1). The plurality of waveguide elements 10 are regularly aligned in a second direction (Y direction in FIG. 1) crossing the first direction. The plurality of waveguide elements 10 cause light to be emitted in a direction D3 crossing a virtual plane parallel with the first and second directions while causing light to propagate in the first direction. Although the first direction (X direction) and the second direction (Y direction) are orthogonal to each other in this example, the first direction and the second direction need not be orthogonal to each other. Although the plurality of waveguide elements 10 are aligned at equal intervals in the Y direction in the example of FIG. 1, the plurality of waveguide elements 10 need not be aligned at equal intervals.

Each of the plurality of waveguide elements 10 includes a first mirror 30 and a second mirror 40 that face each other and an optical waveguide layer 20 located between the mirror 30 and the mirror 40. The mirror 30 and the mirror 40 each have a reflecting surface on a boundary with the optical waveguide layer 20. The mirrors 30 and 40 and the optical waveguide layer 20 each have a shape extending in the first direction (X direction).

Although the plurality of waveguide elements 10 are separate from one another in the example of FIG. 1, at least some of the plurality of waveguide elements 10 may be continuous with each other. For example, at least one of the first mirror 30, the second mirror 40, or the optical waveguide layer 20 of one waveguide element 10 may be continuous with that of another waveguide element 10.

The reflecting surface of the first mirror 30 and the reflecting surface of the second mirror 40 are almost parallel with each other and face each other. Of these mirrors, at least the first mirror 30 has a property of transmitting a part of light propagating through the optical waveguide layer 20. In other words, the first mirror 30 has higher light transmittance regarding the light than the second mirror 40. Accordingly, a part of light propagating through the optical waveguide layer 20 is emitted to an outside from the first mirror 30. Such mirrors 30 and 40 may be, for example, made of a dielectric multi-layer.

As indicated by the arrows in FIG. 1, when light is input to each waveguide element 10, light is emitted from an emission surface of the waveguide element 10. The emission surface is located on a side opposite to the reflecting surface of the first mirror 30. The direction D3 of the emitted light depends on a refractive index and a thickness of the optical waveguide layer and a wavelength of the light. In this example, at least one of the refractive index, the thickness, or the wavelength of each optical waveguide layer is controlled in synchronization with those of other optical waveguide layers so that light beams are emitted in an almost same direction from the waveguide elements 10. This can change a component, in the X direction, of a wave vector of the light emitted from the plurality of waveguide elements 10. In other words, the direction D3 of the emitted light can be changed along a direction 101 illustrated in FIG. 1.

Furthermore, since light beams emitted from the plurality of waveguide elements 10 face the same direction, the emitted light beams interfere with one another. A direction in which the light beams enhance one another by the interference can be changed by controlling a phase of light emitted from each of the waveguide elements 10. For example, in a case where the plurality of waveguide elements 10 of the same size are aligned at equal intervals in the Y direction, light beams having phases that differ from one another by a constant amount are input to the plurality of waveguide elements 10. A component, in the Y direction, of the wave vector of the emitted light can be changed by changing the phase difference. In other words, the direction D3 in which the emitted light beams enhance one another by the interference can be changed along a direction 102 illustrated in FIG. 1 by changing phase differences of light beams introduced into the plurality of waveguide elements 10. This can realize two-dimensional scan using light.

In uses that do not need two-dimensional scan, it is unnecessary to provide a plurality of waveguide elements. One-dimensional scan along the X direction illustrated in FIG. 1 can be performed as long as the light emitting device includes a single waveguide element. Such a light emitting device specialized in one-dimensional scan can be used depending on a use.

Figure 2:
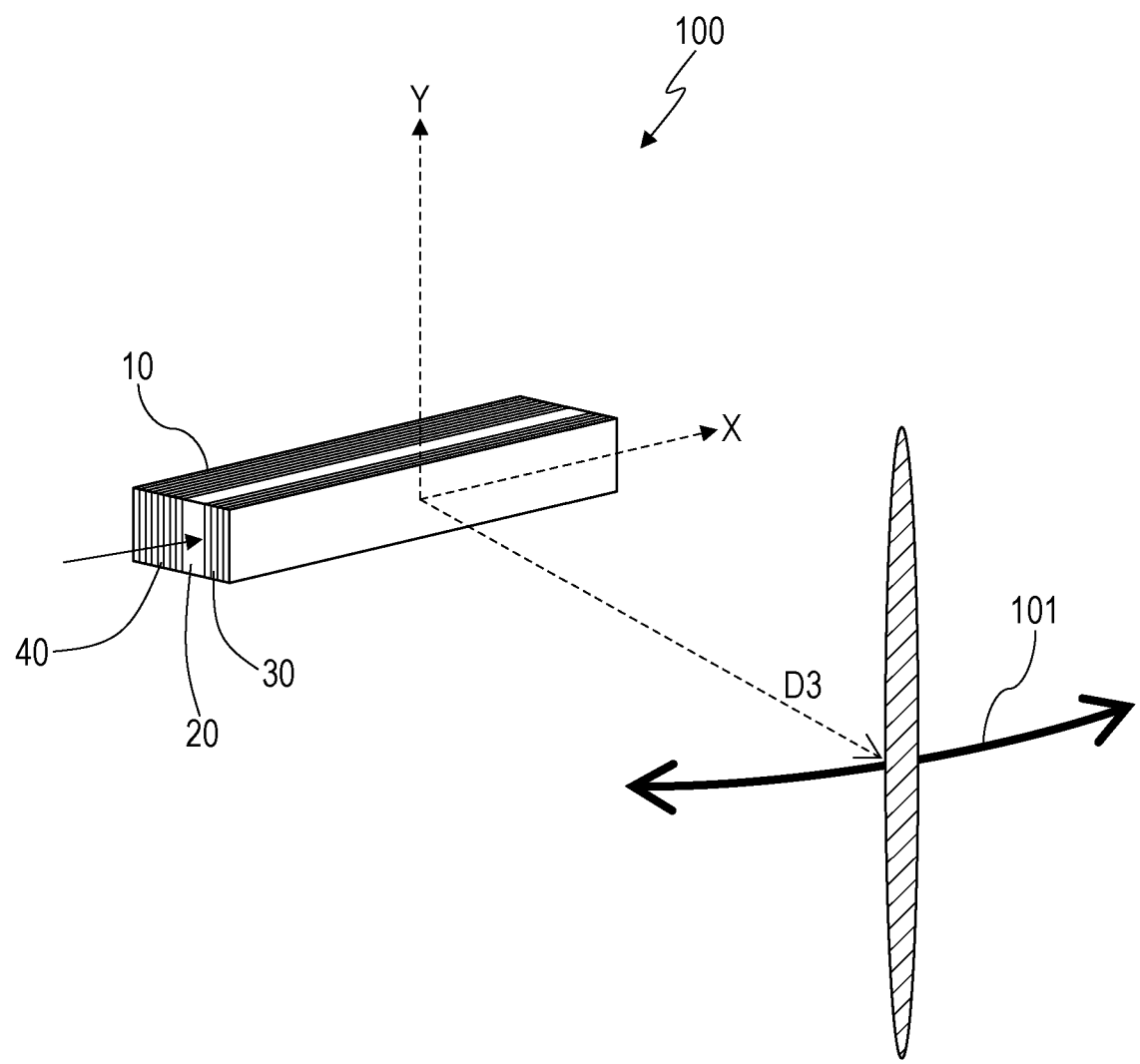
FIG. 2 schematically illustrates an example of a light emitting device that realizes one-dimensional scan by a single waveguide element.

FIG. 2 schematically illustrates an example of the light emitting device 100 that realizes one-dimensional scan by using a single waveguide element 10. In this example, light that expands in the Y direction is emitted. A light emission direction can be moved along the X direction by changing a refractive index or a thickness of the optical waveguide layer 20 or a wavelength of light input to the optical waveguide layer 20. This can realize one-dimensional scan. Since the emitted light expands in the Y direction, a relatively wide area expanding two-dimensionally can be scanned even by scan in one axial direction. In uses that do not need two-dimensional scan, a configuration such as the one illustrated in FIG. 2 may also be employed.

Figure 3:
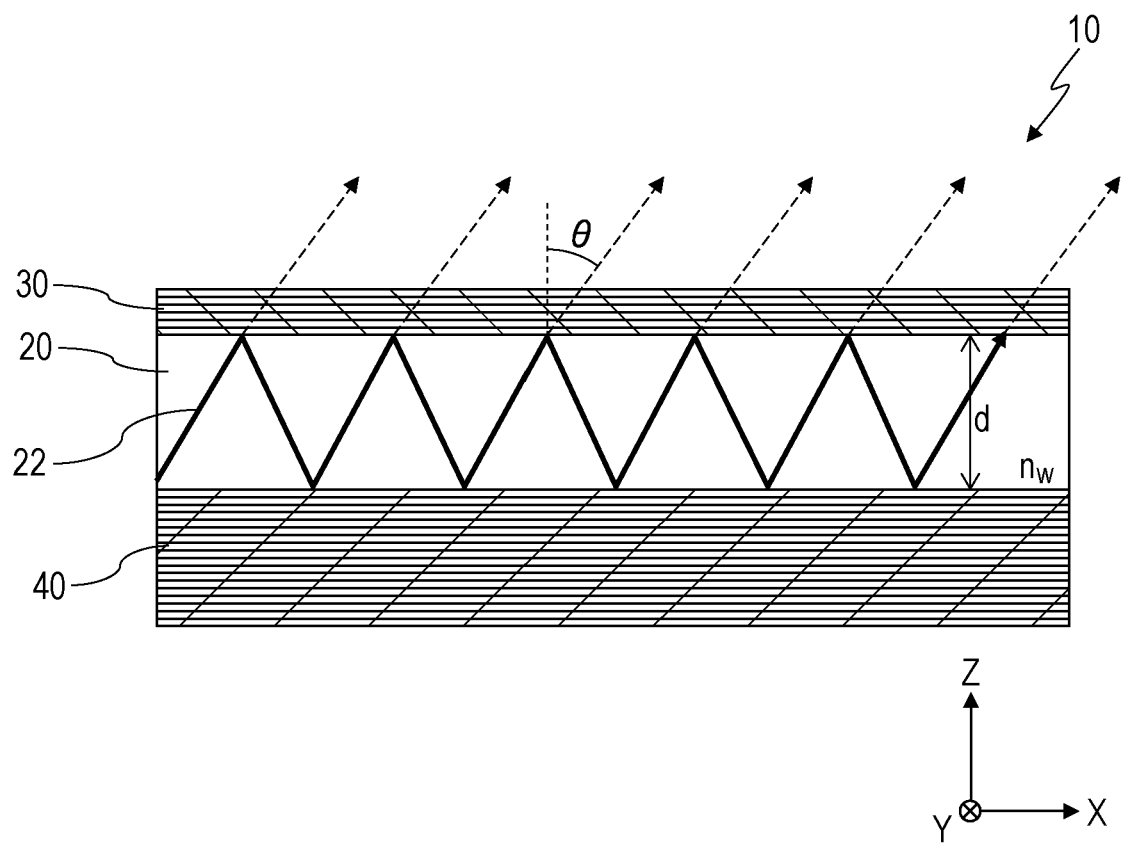
FIG. 3 schematically illustrates an example of a cross-sectional structure of the waveguide element and propagating light.

FIG. 3 schematically illustrates an example of a cross-sectional structure of one waveguide element 10 and propagating light. FIG. 3 schematically illustrates a cross section of the waveguide element 10 parallel with an XZ plane assuming that a direction perpendicular to the X direction and the Y direction illustrated in FIG. 1 is a Z direction. Light 22 introduced from one end of the optical waveguide layer 20 in the X direction propagates through the optical waveguide layer 20 while being repeatedly reflected by the first mirror 30 and the second mirror 40. Light transmittance of the first mirror 30 is higher than light transmittance of the second mirror 40. Accordingly, a part of the light can be output mainly from the first mirror 30.

In a typical waveguide such as an optical fiber, light propagates along the waveguide while repeating total reflection. Meanwhile, in the waveguide element 10, light propagates while being repeatedly reflected by the mirrors 30 and 40 disposed on upper and lower sides of the optical waveguide layer 20. Accordingly, there is no restriction on a light propagation angle. The light propagation angle means an incident angle onto a boundary between the mirror 30 or the mirror 40 and the optical waveguide layer 20. According to the configuration, light that is incident onto the boundary at an angle smaller than a critical angle of total reflection, that is, an angle close to a right angle can also propagate. A group velocity of light in the light propagation direction is lower than a light speed in a free space. Accordingly, the waveguide element 10 has such a nature that a light propagation condition markedly changes relative to a change of a wavelength of light, a thickness of the optical waveguide layer 20, and a refractive index of the optical waveguide layer 20. Such a waveguide element 10 is also referred to as a "slow-light waveguide".

An emission angle θ of light emitted from the waveguide element 10 into the air is expressed by the following formula (1) where λ is a wavelength of the propagating light in the air, $n_w$ is a refractive index of the optical waveguide layer 20, and d is a thickness of the optical waveguide layer 20:

$$\sin\theta = \sqrt{n_w^2 - \left(\frac{m\lambda}{2d}\right)^2} \tag{1}$$

As is clear from the formula (1), a light emission direction can be changed by changing any of the wavelength λ, the refractive index $n_w$, and the thickness d.

For example, in a case where $n_w=2$, d=387 nm, =1550 nm, and m=1, the emission angle is 0°. When the refractive index $n_w$ is changed to 2.2 from this state, the emission angle changes to approximately 66°. Meanwhile, when the thickness d is changed to 420 nm without changing the refractive index, the emission angle changes to approximately 51°. When the wavelength λ is changed to 1500 nm without changing the refractive index nor the thickness, the emission angle changes to approximately 30°. By thus changing any of the wavelength λ of the light, the refractive index $n_w$ of the optical waveguide layer 20, and the thickness d of the optical waveguide layer 20, it is possible to change the light emission direction markedly.

In view of this, in the embodiment of the present disclosure, a light emission direction is controlled by controlling at least one of the wavelength λ of light input to the optical waveguide layer 20, the refractive index $n_w$ of the optical waveguide layer 20, or the thickness d of the optical waveguide layer 20. The wavelength λ of the light may be kept constant without being changed during operation. In this case, scan of light can be realized with a simpler configuration. The wavelength λ is not limited in particular. The wavelength λ can be included, for example, in a wavelength range from 400 nm to 1100 nm (from visible light to near infrared light). This wavelength range is a wavelength range in which high detection sensitivity can be obtained by a typical photodetector or image sensor that detects light by absorbing light by silicon (Si). In another example, the wavelength λ can be included in a wavelength range of near infrared light from 1260 nm to 1625 nm in which a transmission loss in an optical fiber or an Si waveguide is relatively small. Note that these wavelength ranges are examples. A used wavelength range of light is not limited to a wavelength range of visible light or infrared light and may be, for example, a wavelength range of ultraviolet light.

The light emitting device 100 may include a driving device (also referred to as a "first adjustment element") that changes at least one of a refractive index, a thickness, or a wavelength of the optical waveguide layer 20 in each of the waveguide elements 10 to change a direction of emitted light.

The optical waveguide layer 20 may contain a material, such as a liquid crystal material or an electro-optic material, whose refractive index changes upon application of a voltage. The optical waveguide layer 20 can be disposed between a pair of electrodes. A refractive index of at least a part of the optical waveguide layer 20 can be changed by applying a voltage to the pair of electrodes.

A driving device, such as an actuator, that changes the thickness may be connected to at least one of the first mirror 30 or the second mirror 40. The thickness of the optical waveguide layer 20 can be changed by changing a distance between the first mirror 30 and the second mirror 40 by using such a device. In a case where the optical waveguide layer 20 is made of a gas or a liquid, the thickness of the optical waveguide layer 20 can be easily changed.

Next, an operation principle of two-dimensional scan using a waveguide array in which a plurality of waveguide elements are aligned in one direction is described.

In the waveguide array, a light emission direction changes due to interference of light beams emitted from the waveguide elements 10. The light emission direction can be changed by adjusting phases of light beams supplied to the waveguide elements 10.

Figure 4A:
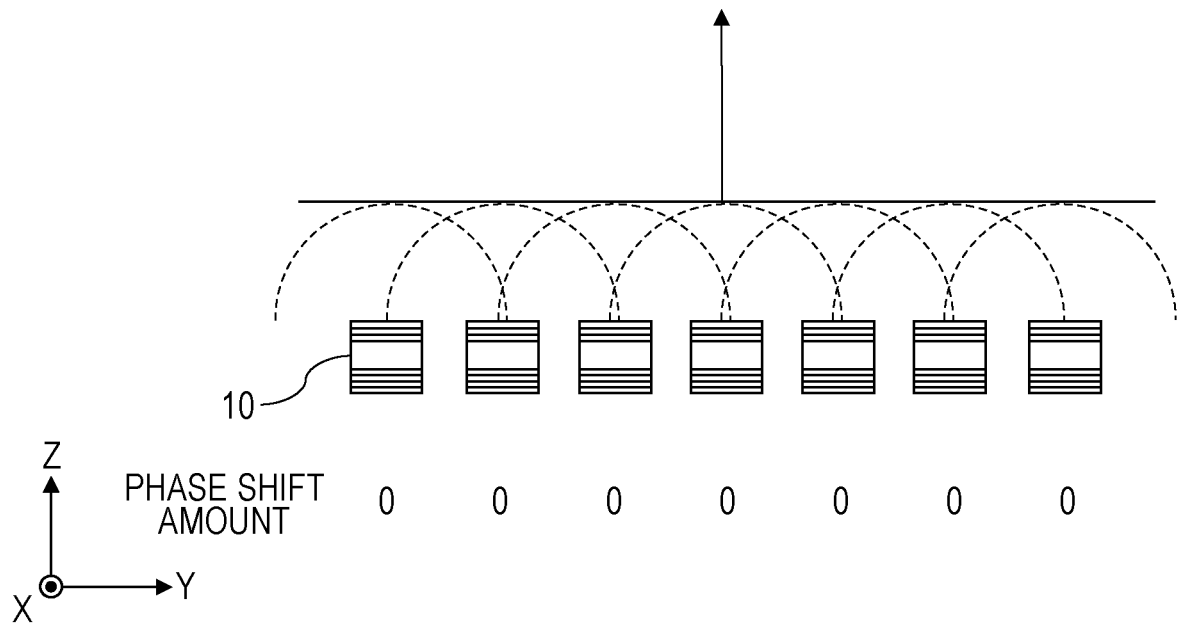
FIG. 4A illustrates a cross section of a waveguide array that emits light in a direction perpendicular to an emission surface of the waveguide array.

FIG. 4A illustrates a cross section of a waveguide array that emits light in a direction perpendicular to an emission surface of the waveguide array. FIG. 4A also describes a phase shift amount of light propagating through each waveguide element 10. The phase shift amount is a value based on a phase of light propagating through a leftmost waveguide element 10. The waveguide array illustrated in FIG. 4A includes a plurality of waveguide elements 10 aligned at equal intervals. In FIG. 4A, the broken-line arcs indicate wave fronts of light emitted from the waveguide elements 10. The straight line indicates a wave front formed by interference of the light. The arrow indicates a direction (i.e., a direction of a wave vector) of light emitted from the waveguide array. In the example illustrated in FIG. 4A, phases of light propagating through the optical waveguide layers 20 in the waveguide elements 10 are the same. In this case, light is emitted in a direction (Z direction) perpendicular to both of a direction (Y direction) in which the waveguide elements 10 are aligned and a direction (X direction) in which the optical waveguide layer 20 extends.

Figure 4B:
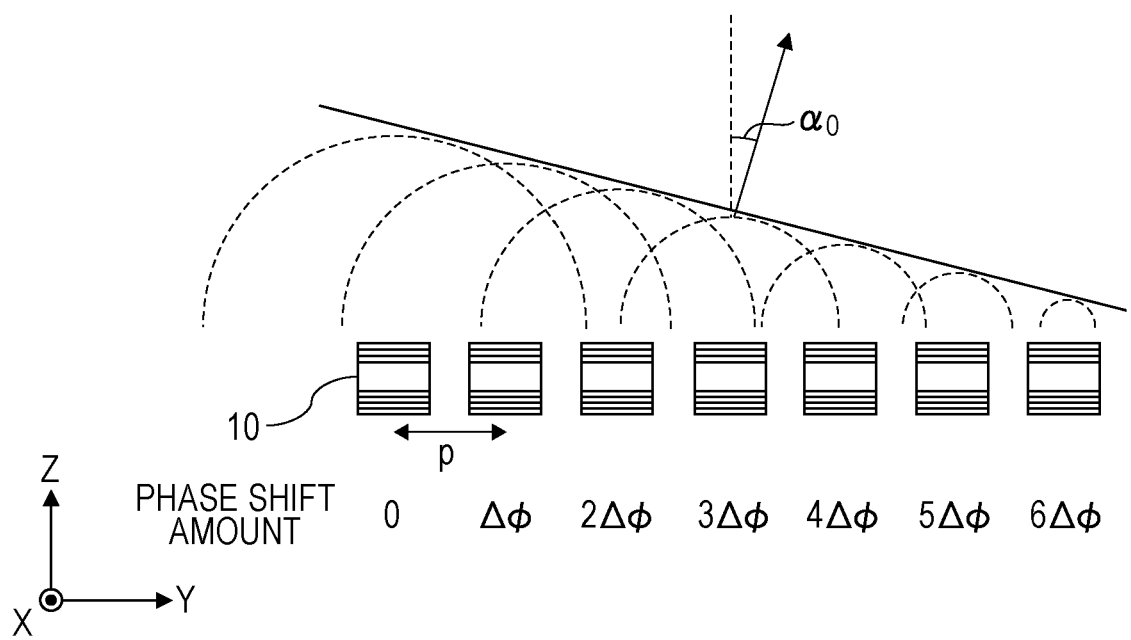
FIG. 4B illustrates a cross section of a waveguide array that emits light in a direction different from the direction perpendicular to the emission surface of the waveguide array.

FIG. 4B illustrates a cross section of a waveguide array that emits light in a direction different from the direction perpendicular to the emission surface of the waveguide array. In the example illustrated in FIG. 4B, phases of light beams propagating through the optical waveguide layers 20 in the plurality of waveguide elements 10 vary from one another by a constant amount (Δφ) in the direction in which the plurality of waveguide elements 10 are aligned. In this case, light is emitted in a direction different from the Z direction. By changing Δφ, a component, in the Y direction, of a wave vector of the light can be changed. A light emission angle $\alpha_0$ is expressed by the following formula (2) where p is a distance between centers of adjacent two waveguide elements 10:

$$\sin\alpha_0 = \frac{\Delta\phi\lambda}{2\pi p} \quad (2)$$

In the example illustrated in FIG. 3, the light emission direction is parallel with the XZ plane. That is, $\alpha_0 = 0°$. In the example illustrated in FIGS. 4A and 4B, a direction of light emitted from the light emitting device 100 is parallel with the YZ direction. That is, θ=0°. However, in general, a direction of light emitted from the light emitting device 100 is not parallel with the XZ plane nor the YZ plane. That is, θ is not equal to 0°, and $\alpha_0$ is not equal to 0°.

Figure 5:
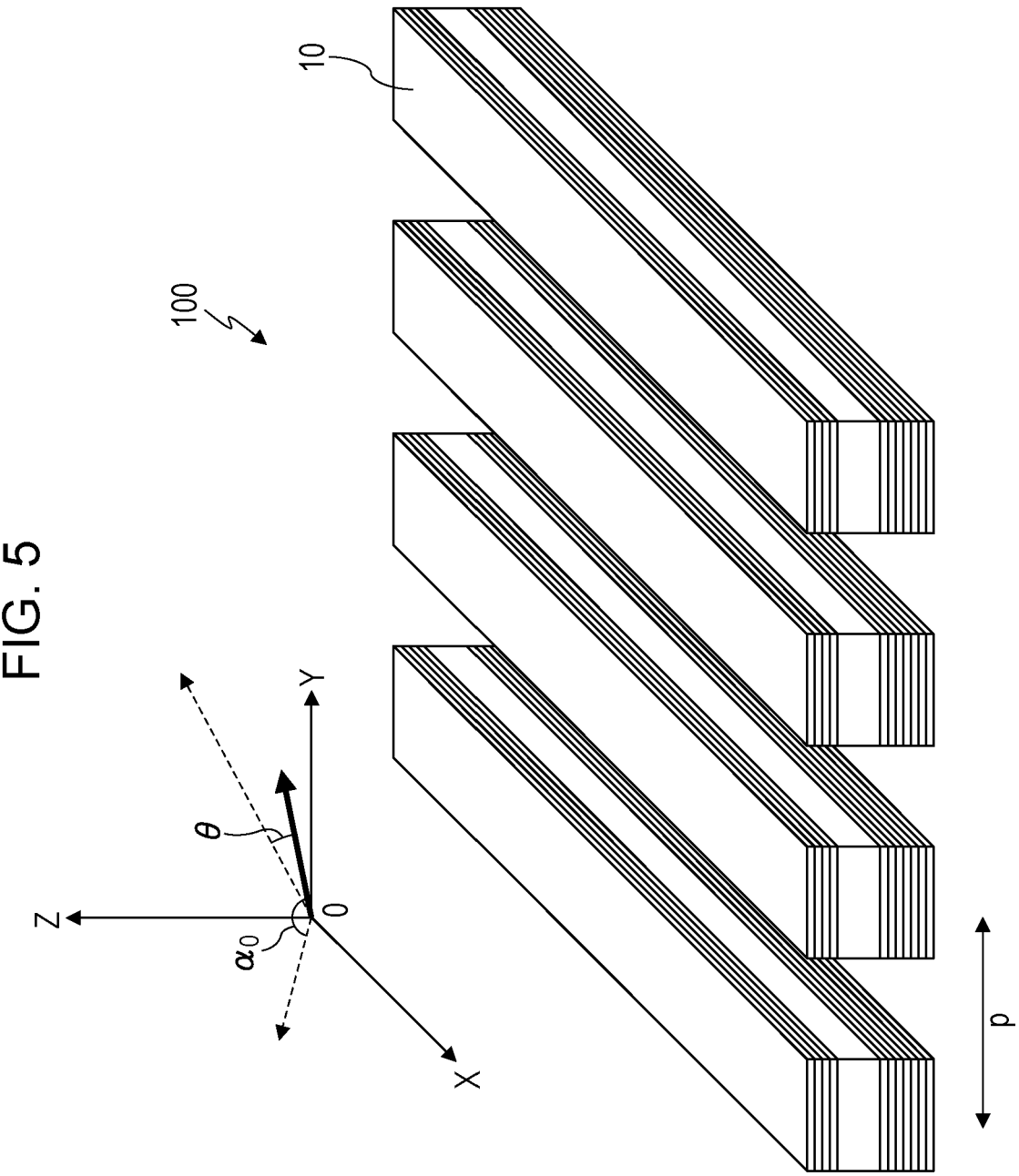
FIG. 5 is a perspective view schematically illustrating an example of a waveguide array.

FIG. 5 is a perspective view schematically illustrating an example of a waveguide array in a three-dimensional space. The thick arrow in FIG. 5 indicates a direction of light emitted from the light emitting device 100. θ is an angle formed between the light emission direction and the YZ plane. θ satisfies the formula (1). $\alpha_0$ is an angle formed between the light emission direction and the XZ plane. $\alpha_0$ satisfies the formula (2).

A phase shifter that changes a phase of light may be, for example, provided in a stage followed by the waveguide elements 10 to control phases of light emitted from the waveguide elements 10. The light emitting device 100 may include a plurality of phase shifters connected to the respective plurality of waveguide elements 10 and a driving device (hereinafter also referred to as a "second adjustment element") that adjusts a phase of light propagating through each of the phase shifters. Each of the phase shifters may include a waveguide connected to the optical waveguide layer 20 in corresponding one of the plurality of waveguide elements 10 directly or with another waveguide interposed therebetween. The second adjustment element changes a direction (the direction D3 illustrated in FIG. 1) of light emitted from the plurality of waveguide elements 10 by changing phase differences of light propagating from the plurality of phase shifters to the plurality of waveguide elements 10. In the following description, the plurality of phase shifters that are aligned are sometimes referred to as a "phase shifter array".

Figure 6:
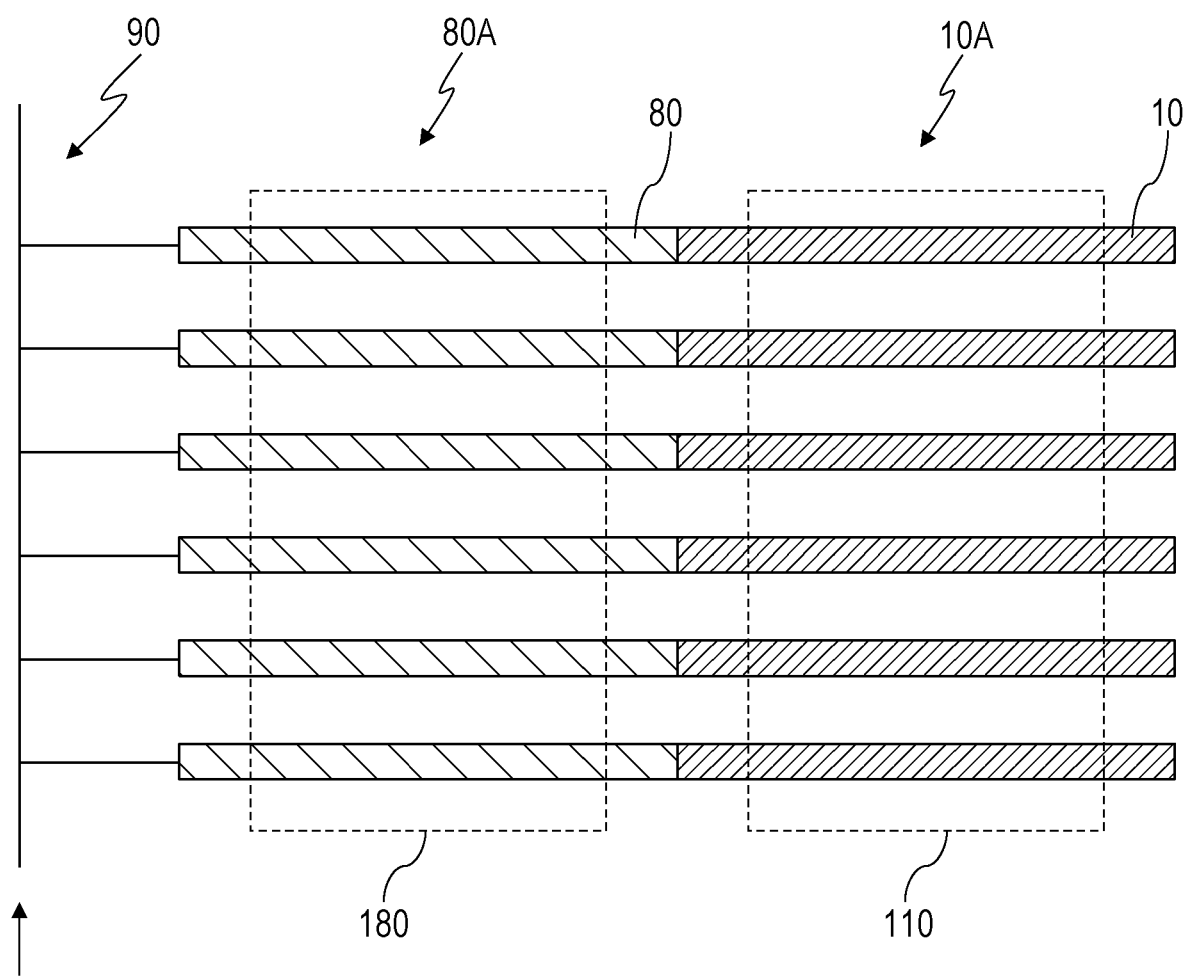
FIG. 6 is a schematic view illustrating an example of connection between the waveguide array and a phase shifter array.

FIG. 6 is a schematic view illustrating an example of connection between a waveguide array 10A and a phase shifter array 80A. In the example illustrated in FIG. 6, all phase shifters 80 are optical waveguides having the same propagation characteristics, and all of the waveguide elements 10 have the same propagation characteristics. The phase shifters 80 may have the same length or may have different lengths, and the waveguide elements 10 may have the same length or may have different lengths. In a case where the phase shifters 80 have the same length, phase shift amounts can be, for example, adjusted by a driving voltage. In a case where the lengths of the phase shifters 80 are changed in equal steps, phase shifts of equal steps can be given by the same driving voltage. Furthermore, this light emitting device 100 includes an optical divider 90 that divides light and supplies the divided light to the plurality of phase shifters 80, a first driving circuit 110 that drives each of the waveguide elements 10, and a second driving circuit 180 that drives each of the phase shifters 80. The straight-line arrow in FIG. 6 indicates input of light. Two-dimensional scan can be realized by independently controlling the first driving circuit 110 and the second driving circuit 180 that are separately provided. In this example, the first driving circuit 110 functions as one element of the first adjustment element, that is, the driving device, and the second driving circuit 180 functions as one element of the second adjustment element, that is, the driving device.

The first driving circuit 110 changes an angle of light emitted from the optical waveguide layer 20 by changing at least one of the refractive index or the thickness of the optical waveguide layer 20 in each of the waveguide elements 10. The second driving circuit 180 changes a phase of light propagating through the waveguide in each of the phase shifters 80 by changing the refractive index of the waveguide. The optical divider 90 may be constituted by a waveguide through which light propagates by total reflection or may be constituted by a slow-light waveguide similar to the waveguide elements 10.

Note that light divided by the optical divider 90 may be introduced into the phase shifters 80 after controlling phases of the divided light beams. For this phase control, for example, a passive phase control structure that controls a phase by adjusting a length of a waveguide to the phase shifter 80 can be used. Alternatively, a phase shifter that has a similar function to the phase shifter 80 and can be controlled by an electric signal may be used. By such a method, for example, phases may be adjusted before light is introduced into the phase shifters 80 so that light of equal phases is supplied to all of the phase shifters 80. Such adjustment can make control of the phase shifters 80 by the second driving circuit 180 simple.

An optical device having a similar configuration to the light emitting device 100 can be also used as a light receiving device. Details of a structure, an operation principle, an operation method, and the like of the optical device are, for example, disclosed in Patent Literatures 2 and 3, entire contents of which are incorporated herein.

Control of Direction and Intensity of Emitted Light

As described above, a light emitting device having a structure of a slow-light waveguide can change a direction of an emitted light beam by changing a refractive index or a thickness of an optical waveguide layer or a wavelength of light input to the optical waveguide layer. Furthermore, an intensity of the emitted light beam can also be controlled by controlling an intensity of light input to the optical waveguide layer.

However, light emission characteristics of the light emitting device can change due to various factors such as a change in environment such as a temperature or a humidity or aging degradation of the device. For example, in a case where the optical waveguide layer is made of a material, such as a liquid crystal material, whose refractive index changes depending on an applied voltage, response characteristics of the refractive index relative to the applied voltage can change due to temperature dependence of the material or aging degradation. As a result, even in a case where the same voltage is applied to the optical waveguide layer, a light emission direction can change depending on an environment or aging. A similar problem can also occur in a configuration in which a direction of emitted light is changed by changing a thickness of the optical waveguide layer or a wavelength of guided light. Furthermore, since an intensity of emitted light depends on an emission angle, it is desirable to properly adjust an intensity of emitted light in accordance with a change of the emitted angle.

In order to solve such a problem, a light emitting device according to an embodiment of the present disclosure includes a photodetector in a stage followed by a waveguide element and in a stage following the waveguide element. A driving device controls an intensity of light emitted from a light source and/or a direction of light emitted from the waveguide element on the basis of an intensity of light detected by the photodetectors. Configuration and operation of such an embodiment are described in more detail below.

Figure 7:
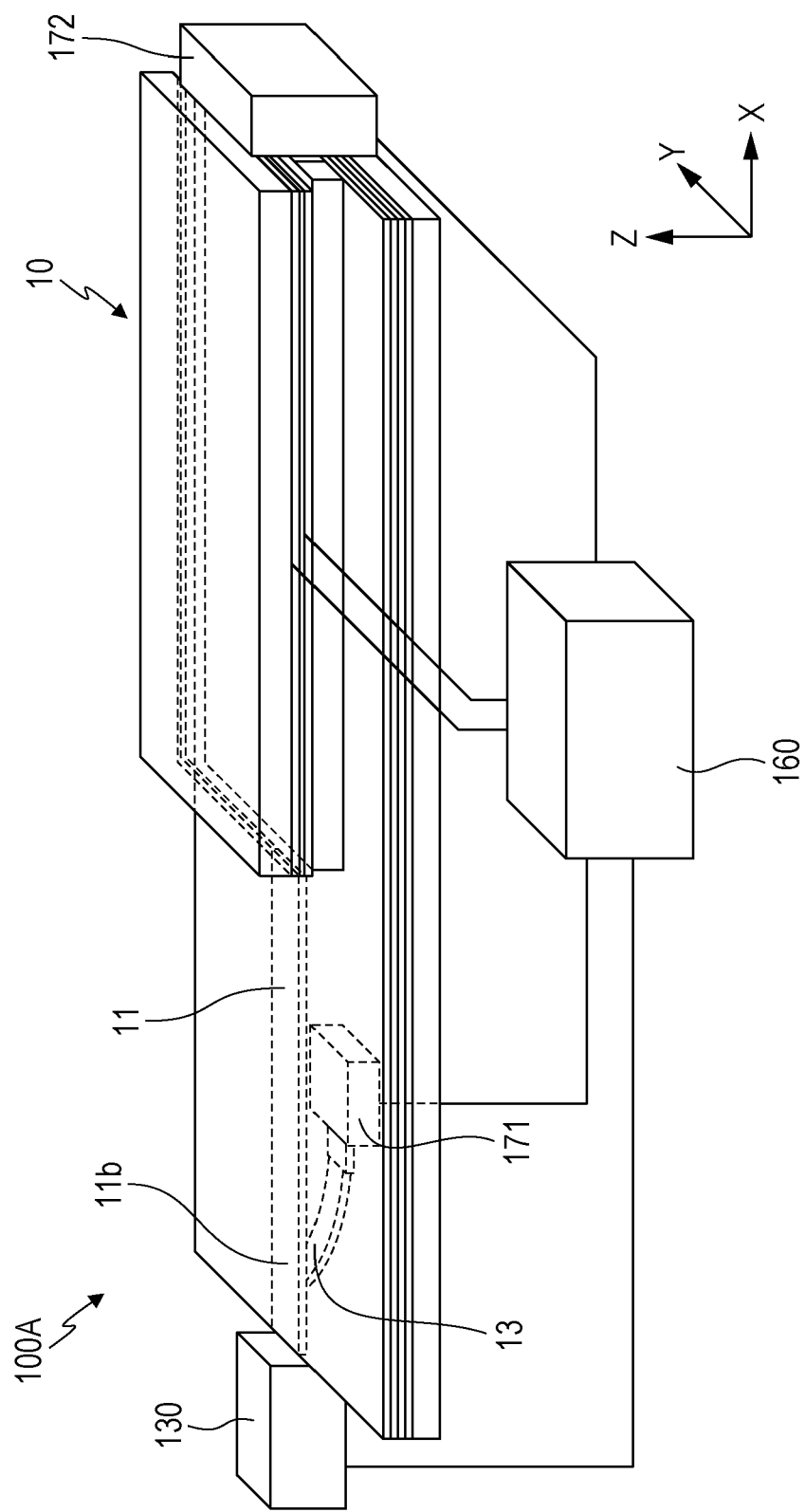
FIG. 7 is a schematic view illustrating an outline configuration of a light emitting device according to an exemplary embodiment.

FIG. 7 is a schematic view illustrating an outline configuration of a light emitting device 100A according to an exemplary embodiment. The light emitting device 100A includes a light source 130, an optical waveguide 11, a waveguide element 10, a first photodetector 171, a second photodetector 172, and a driving device 160. The optical waveguide 11 connects the light source 130 and the waveguide element 10. The optical waveguide 11 has a branching part 11b. Another optical waveguide 13 extends from the branching part 11b. The first photodetector 171 is disposed at a tip of the optical waveguide 13. The first photodetector 171 detects light that has propagated through the optical waveguide 13. The second photodetector 172 is disposed at a position for detecting light that has propagated through an optical waveguide layer of the waveguide element 10. In the example of FIG. 7, the second photodetector 172 is in contact with the waveguide element 10. Such a configuration is not restrictive, and the second photodetector 172 may be configured to detect light that propagates through another optical waveguide (not illustrated) connected to the waveguide element 10.

The light source 130 is configured to emit light to be input to the optical waveguide layer in the waveguide element 10. The light source 130 may include, for example, a light-emitting element such as a semiconductor laser element.

In this example, the waveguide element 10 includes a pair of mirrors, the optical waveguide layer located between the pair of mirrors, and a pair of electrodes for applying a voltage to the optical waveguide layer. The optical waveguide layer may contain a material, such as a liquid crystal material or an electro-optic material, whose refractive index changes upon application of a voltage.

The driving device 160 is connected to the pair of electrodes of the waveguide element 10, the light source 130, the first photodetector 171, and the second photodetector 172. During operation, the driving device 160 acquires signals indicative of light amounts detected by the first photodetector 171 and the second photodetector 172 from the first photodetector 171 and the second photodetector 172 and controls a voltage applied to the pair of electrodes on the basis of these signals. In this way, the driving device 160 controls a direction of light emitted from the waveguide element 10. Furthermore, the driving device 160 controls an intensity of light emitted from the light source 130 on the basis of two signals output from the first photodetector 171 and the second photodetector 172. A specific example of control of the light source 130 and the waveguide element 10 by the driving device 160 will be described later.

Figure 8:
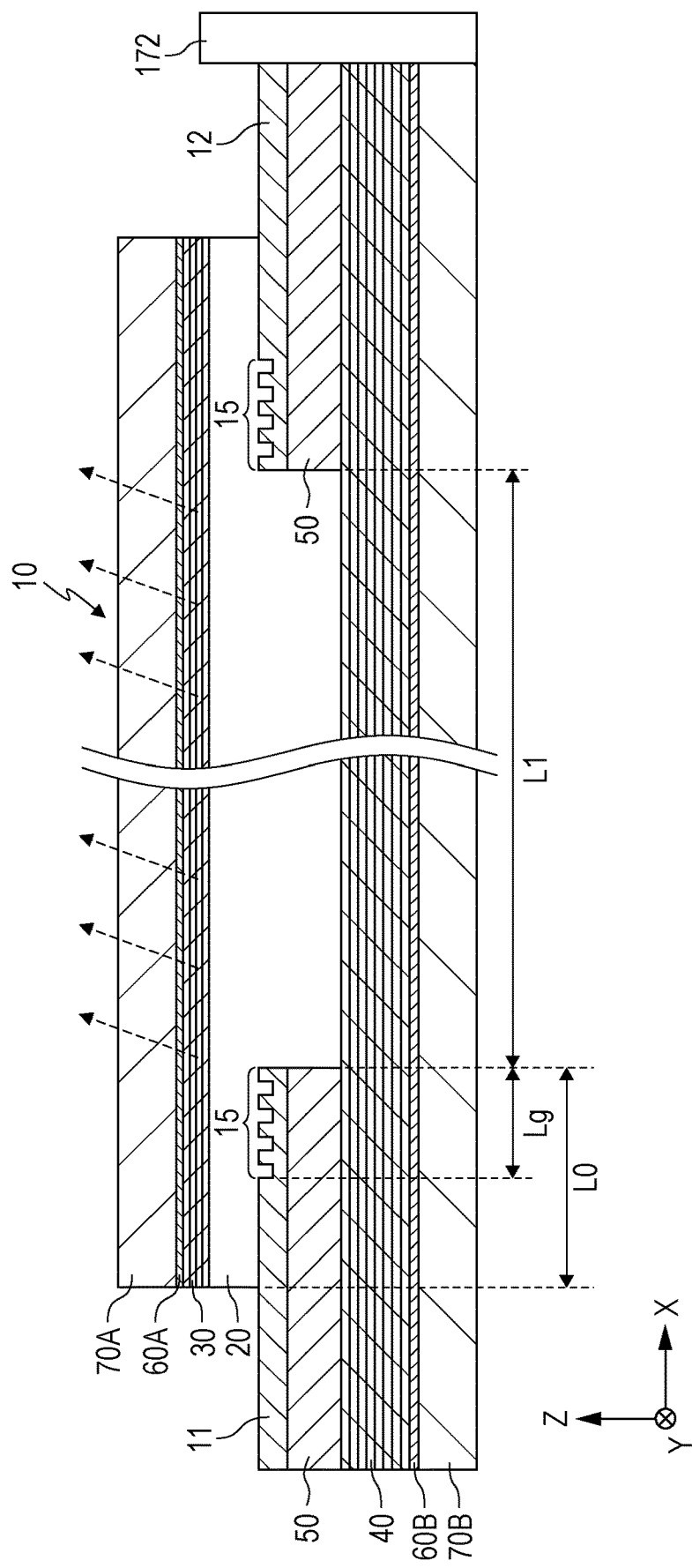
FIG. 8 is a cross-sectional view illustrating an example of a structure of a waveguide element taken along an XZ plane.

FIG. 8 is a cross-sectional view illustrating an example of a structure of the waveguide element 10 taken along the XZ plane. The waveguide element 10 includes a first substrate 70A, a first electrode 60A, a first mirror 30, an optical waveguide layer 20, a second mirror 40, a second electrode 60B, and a second substrate 70B in this order. The first mirror 30 has a structure expanding in a first direction (X direction in this example) and a second direction (Y direction in this example) and extending in the first direction. The first mirror 30 is light transmissive and allows a part of light propagating through the optical waveguide layer 20 along the X direction to be emitted to an outside. Similarly, the second mirror 40 has a structure expanding in the first direction and the second direction and extending in the first direction. In this example, the second mirror 40 is not light transmissive.

The optical waveguide layer 20 is located between the first mirror 30 and the second mirror 40 and extends along the first direction. The optical waveguide layer 20 may be, for example, made of a liquid crystal material or an electro-optic material. The substrates 70A and 70B may be, for example, made of a semiconductor such as Si or a dielectric material such as $SiO_2$.

The first electrode 60A is located between the first mirror 30 and the first substrate 70A and is in contact with the first mirror 30 and the first substrate 70A. The second electrode 60B is located between the second mirror 40 and the second substrate 70B and is in contact with the second mirror 40 and the second substrate 70B. The first electrode 60A may be, for example, made of a light-transmissive electrically-conductive material such as indium tin oxide (ITO). The second electrode 60B may be made of any electrically-conductive material without being limited to the light-transmissive electrically-conductive material such as ITO. As illustrated in FIG. 7, the electrodes 60A and 60B are connected to the driving device 160. The driving device 160 includes a driving circuit that applies a voltage to the electrodes 60A and 60B. The driving device 160 changes a refractive index of the optical waveguide layer 20 by changing a voltage applied between the first electrode 60A and the second electrode 60B. This can change an emission angle of a light beam emitted through the first mirror 30, the first electrode 60A, and the first substrate 70A.

FIG. 8 also illustrates a first optical waveguide 11 and a second optical waveguide 12 connected to both ends of the optical waveguide layer 20, respectively. The first optical waveguide 11 and the second optical waveguide 12 are supported on a dielectric member 50 provided on the second mirror 40.

An end of each of the optical waveguides 11 and 12 in the present embodiment is located inside the optical waveguide layer 20 and includes a grating 15. Each grating 15 includes a plurality of recessed parts arranged in the X direction. Although each grating 15 includes four recessed parts in the example of FIG. 8, a larger number of recessed parts may be provided. A plurality of raised parts may be provided instead of the plurality of recessed parts. The number of recessed parts or raised parts arranged in the X direction in each grating 15 may be, for example, equal to or greater than 4 and equal to or less than 64. The number of recessed parts or raised parts in each grating 15 may be adjusted in accordance with diffraction efficiency of each recessed part or raised part. The diffraction efficiency of each recessed part or raised part depends on dimensional conditions such as a depth or a height and a width thereof. Accordingly, the number of recessed parts or raised parts is adjusted in accordance with dimensions of each recessed part or raised part so that good characteristics are obtained as the whole grating 15.

In the example illustrated in FIG. 8, a dimension Lg, in the X direction, of a region where the grating 15 is provided may be, for example, within a range of approximately 4 μm to 50 μm. For example, approximately 8 cycles to 32 cycles of gratings 15 may be provided within a region of such a size. Although a dimension L0, in the X direction, of a part of the first optical waveguide 11 located inside the optical waveguide layer 20 is larger than the dimension Lg, in the X direction, of the region where the grating 15 is provided in the present embodiment, L0 and Lg may be equal to each other. Although the first optical waveguide 11 and the second optical waveguide 12 are symmetrical in the example of FIG. 8, the first optical waveguide 11 and the second optical waveguide 12 may be asymmetrical. A dimension L1, in the X direction, of a part of the optical waveguide layer 20 that is located between the first optical waveguide 11 and the second optical waveguide 12 is larger than Lg and may be, for example, within a range of approximately 100 μm to 5 mm. However, such dimensions are not restrictive, and dimensions of the members are decided in accordance with necessary characteristics.

Each of the first optical waveguide 11 and the second optical waveguide 12 may be made of a dielectric material having a higher refractive index than the dielectric member 50 and the optical waveguide layer 20. Each of the optical waveguides 11 and 12 is a total reflection waveguide and allows light to propagate along the X direction. Light propagating through the first optical waveguide 11 is converted into light propagating through the optical waveguide layer 20 at a high efficiency by the grating 15. Similarly, light propagating through the optical waveguide layer 20 is converted into light propagating through the second optical waveguide 12 at a high efficiency by the grating 15.

Connection between each of the first optical waveguide 11 and the second optical waveguide 12 and the optical waveguide layer 20 may be realized by a structure different from the structure according to the present embodiment. For example, the tips of the optical waveguides 11 and 12 may be in contact with the optical waveguide layer 20 on outer sides of the optical waveguide layer 20. Each waveguide may have any structure, as long as optical coupling between the first optical waveguide 11 and the optical waveguide layer 20 and optical coupling between the optical waveguide layer 20 and the second optical waveguide 12 can be achieved.

As illustrated in FIG. 7, the first photodetector 171 (not illustrated in FIG. 8) that detects light propagating through the optical waveguide 13 branching off from the first optical waveguide 11 is disposed. The first photodetector 171 includes a photoelectric conversion element such as a photodiode and outputs a first signal according to a received light amount. An intensity of light propagating through the optical waveguide 13 is almost proportional to an intensity of light propagating through the first optical waveguide 11 and input to the optical waveguide layer 20. Accordingly, the first signal output from the first photodetector 171 reflects an intensity of light input to the optical waveguide layer 20.

In the example illustrated in FIG. 8, the second photodetector 172 detects light that has propagated through the second optical waveguide 12. The second optical waveguide 12 guides, to the second photodetector 172, light that has propagated through the optical waveguide layer 20 along the first direction and passed the optical waveguide layer 20. The second photodetector 172 includes a photoelectric conversion element such as a photodiode and outputs a second signal according to a received light amount. The second signal reflects an intensity of a part, of the light input to the optical waveguide layer 20, that has not been emitted to an outside through the first mirror 30.

Figure 9:
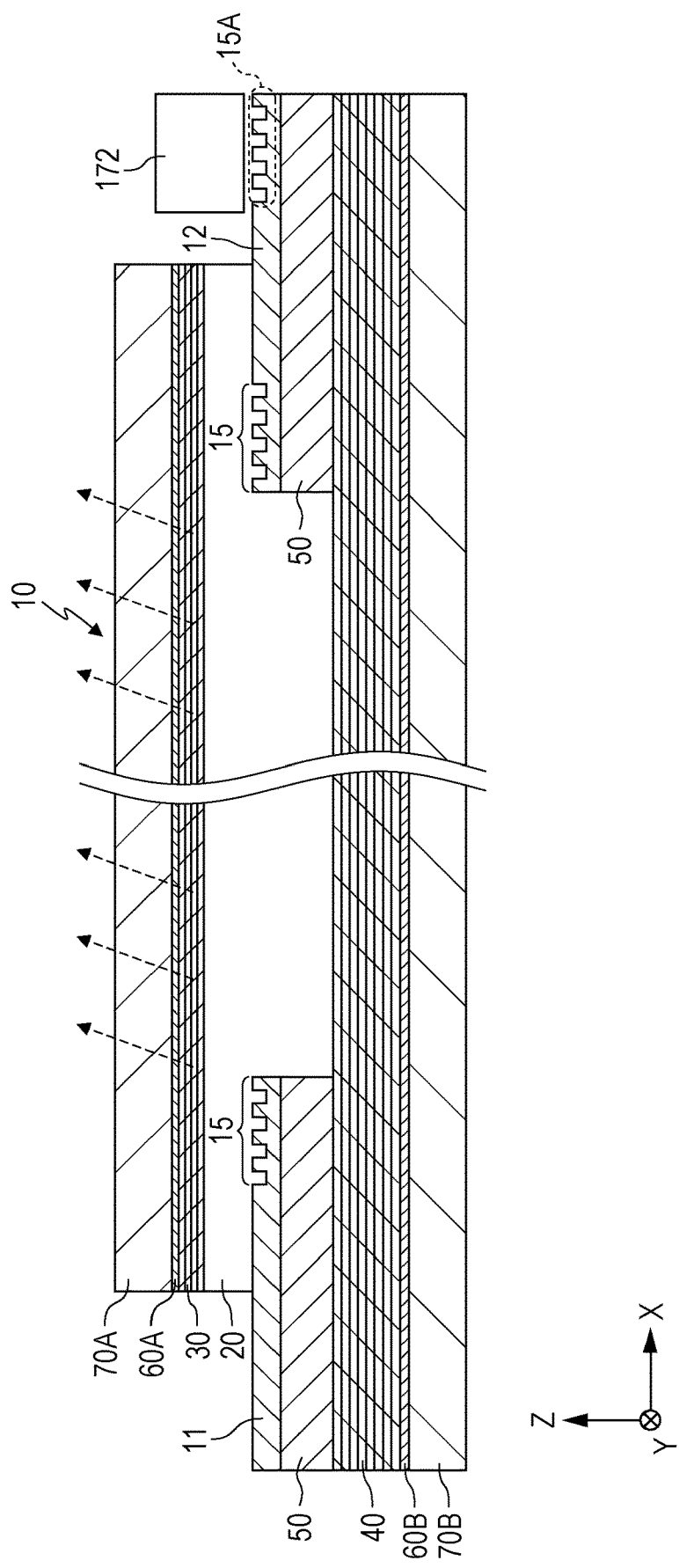
FIG. 9 is a cross-sectional view illustrating another example of a structure of the waveguide element taken along the XZ plane.

A way in which the second photodetector 172 is disposed is not limited to the one illustrated in FIG. 8 and may be, for example, one illustrated in FIG. 9. In the example illustrated in FIG. 9, the second optical waveguide 12 has, in addition to the grating 15 at an end located inside the optical waveguide layer 20, a grating 15A at an opposite end. The second photodetector 172 is disposed so as to detect light emitted through the grating 15A. Even in a case where the second photodetector 172 is disposed in this way, the second photodetector 172 can acquire a signal according to an amount of light that has passed the optical waveguide layer 20.

Note that a method similar to the method for causing light to enter the second photodetector 172 illustrated in FIG. 8 or 9 may be used as a method for causing light propagating through the optical waveguide 13 illustrated in FIG. 7 to enter the first photodetector 171. Although the first photodetector 171 detects light propagating through the waveguide 13 branching off from the first optical waveguide 11 in the present embodiment, the first photodetector 171 may be configured to directly detect light propagating through the first optical waveguide 11.

Each of the first photodetector 171 and the second photodetector 172 is not limited to a photodetector including a single photoelectric conversion element and may be a photodetector, such as an image sensor, including a plurality of photoelectric conversion elements. In particular, in a case where a plurality of waveguide elements 10 are aligned along the Y direction, an image sensor in which a plurality of photoelectric conversion elements are aligned in the Y direction may be used as each of the photodetectors 171 and 172.

Although the first photodetector 171 is disposed away from the light source 130 in the present embodiment, the first photodetector 171 may be included in the light source 130. For example, in a case where a laser diode including a light output feedback function is used as the light source 130, an output signal obtained from a feedback mechanism may be used as a detection signal of the first photodetector 171.

Figure 10:
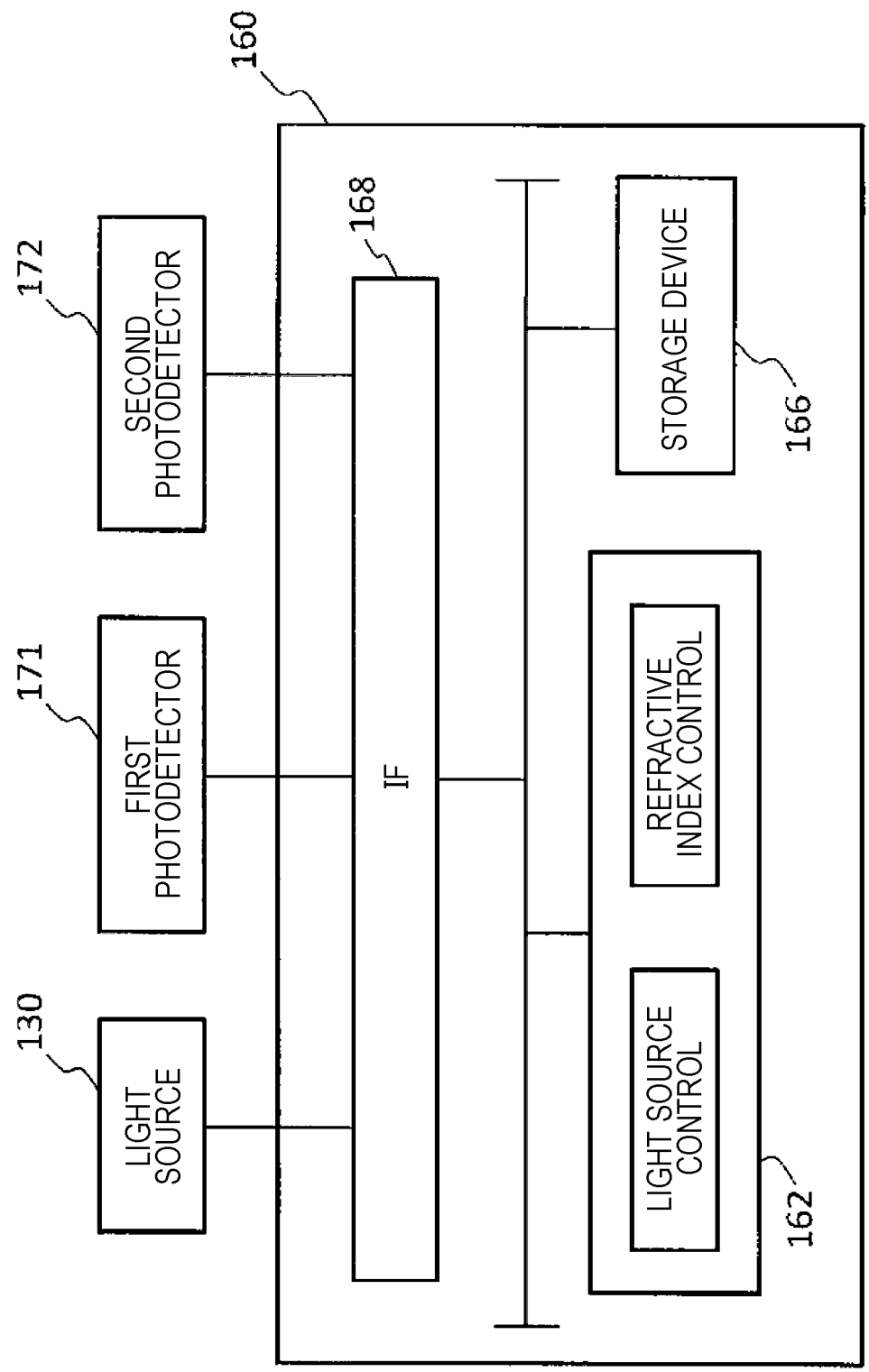
FIG. 10 is a block diagram illustrating an outline configuration of a driving device.

FIG. 10 is a block diagram illustrating an outline configuration of the driving device 160 according to the present embodiment. The driving device 160 includes an interface (IF) 168, a control circuit 162, and a storage device 166. The interface 168 is connected to the light source 130, the first photodetector 171, and the second photodetector 172 and performs signal transmission with these devices. The control circuit 162 is a circuit that controls a refractive index of the optical waveguide layer 20 and a light emission intensity of the light source 130. The control circuit 162 may include one or more processors. The storage device 166 includes a memory such as a RAM and a ROM and stores therein a computer program executed by the control circuit 162 and various kinds of data. The control circuit 162 controls a light emission intensity of the light source 130 and a voltage applied to the optical waveguide layer 20 on the basis of the first signal output from the first photodetector 171 and the second signal output from the second photodetector 172. In this way, an intensity and a direction of light emitted through the first mirror 30 of the waveguide element 10 are controlled.

In the present embodiment, an emission angle of light emitted through the first mirror 30 depends on a propagation angle of light propagating through the optical waveguide layer 20. This propagation angle depends on a refractive index of the optical waveguide layer 20. Accordingly, in a case where the optical waveguide layer 20 is made of a material, such as liquid crystal, whose refractive index can be modulated in accordance with an applied voltage, the emission angle can be controlled by the applied voltage.

An intensity of light in the optical waveguide layer 20 gradually attenuates while the light propagates along the X direction. This is because a part of the propagating light is released to an outside through the first mirror 30 while the light propagates. An attenuation rate is decided by angle dependence of reflectance of the first mirror 30 and the second mirror 40. Accordingly, the attenuation rate depends on a propagation angle of light propagating through the optical waveguide layer 20. In a case where a light intensity is detected at any two points on a path including the optical waveguide layer 20 as in the present embodiment, an attenuation rate and/or an attenuation amount can be calculated from detection results thus obtained. In this way, a propagation angle in the optical waveguide layer 20 or an angle of light emitted to an outside and/or an intensity of the emitted light can be estimated.

Figure 11:
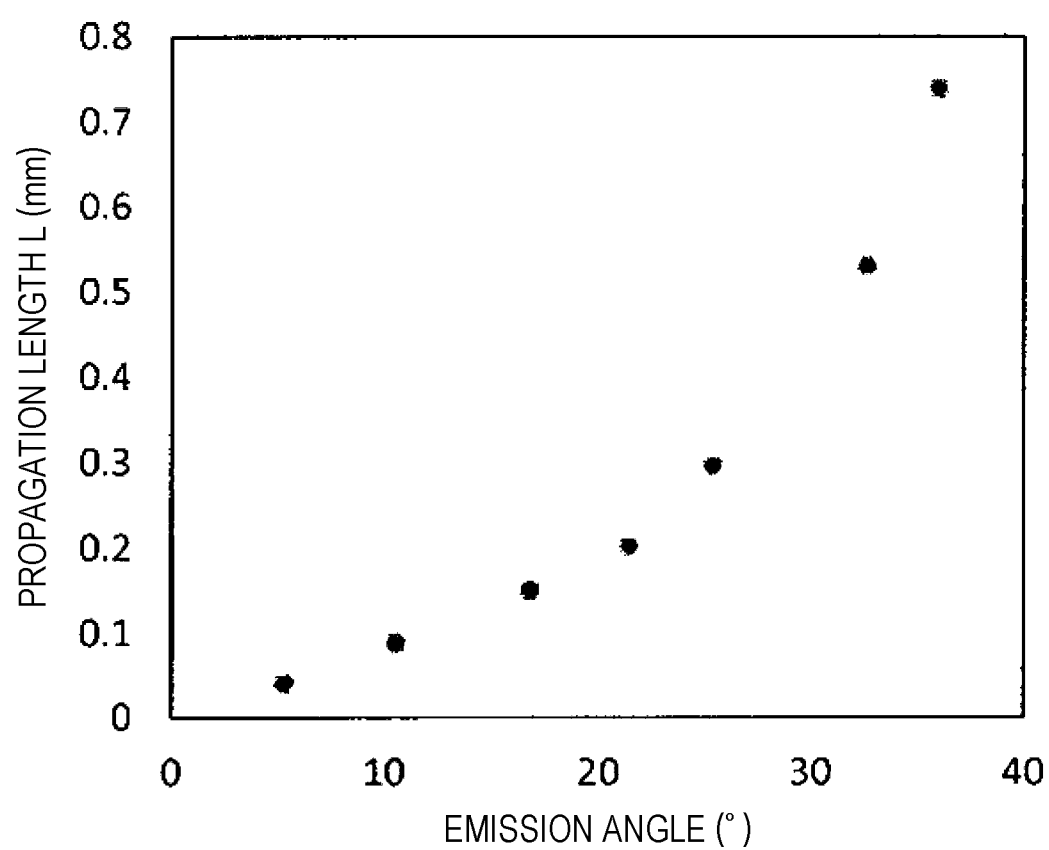
FIG. 11 illustrates an example of a relationship between an angle of light emitted from the waveguide element and a propagation length L of light in the optical waveguide layer.

FIG. 11 illustrates a relationship between an angle of light emitted from the waveguide element 10 and a propagation length L of light in the optical waveguide layer 20 in a certain example. The propagation length L indicates a distance from a certain start point in the optical waveguide layer 20 to a point at which a light intensity of light propagating along the X direction attenuates to 1/e of a light intensity at the start point where e is a base of natural logarithm and is approximately equal to 2.718. The result illustrated in FIG. 11 was obtained by numerical calculation as for the waveguide element 10 having the following configuration. A DBR in which a high refractive index layer and a low refractive index layer were alternately laminated to form 17 layers was used as the first mirror 30. A refractive index of each high refractive index layer was set to 2.28, a thickness of each high refractive index layer was set to 111 nm, a refractive index of each low refractive index layer was set to 1.47, and a thickness of each low refractive index layer was set to 173 nm. A DBR in which a high refractive index layer and a low refractive index layer were alternately laminated to form 21 layers was used as the second mirror 40. A refractive index of each high refractive index layer was set to 2.36, a thickness of each high refractive index layer was set to 107 nm, a refractive index of each low refractive index layer was set to 1.47, and a thickness of each low refractive index layer was set to 172 nm. Both of initial and last layers of each of the first mirror 30 and the second mirror 40 are high refractive index layers. A thickness of the optical waveguide layer 20 was set to 2.02 µm. A refractive index of the optical waveguide layer 20 was changed in a range of 1.68 to 1.55 to change an emission angle. Note that the emission angle is an angle of emission to the atmosphere whose refractive index is almost 1 and it is assumed that there is no absorption loss during propagation through a waveguide. FemSim produced by Synopsys, Inc. was used for the numerical calculation.

Figure 12:
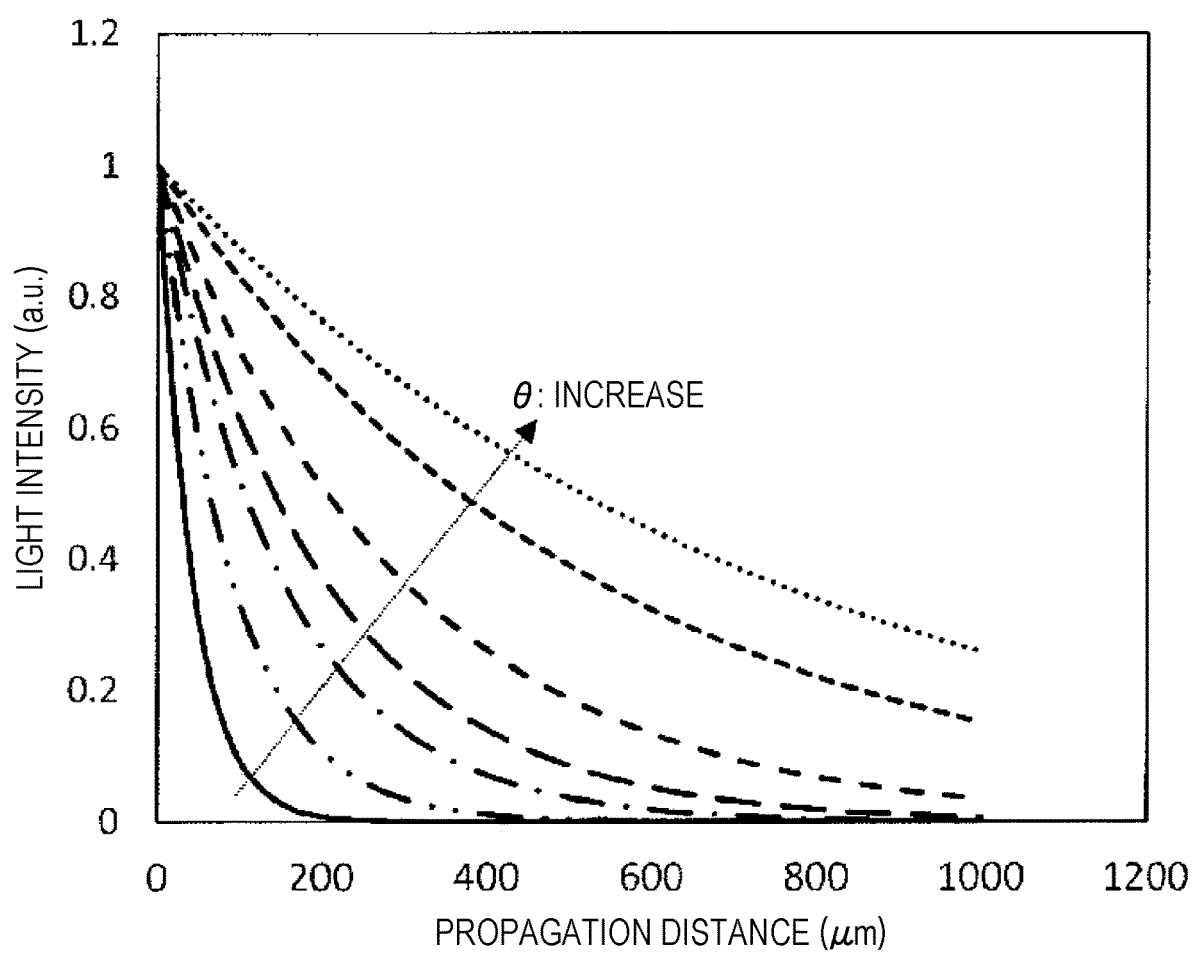
FIG. 12 illustrates, for each of the emission angles illustrated in FIG. 11, an approximate value of a light intensity distribution in the optical waveguide layer.

FIG. 12 illustrates an approximate value of a light intensity distribution in the optical waveguide layer 20 by an arbitrary unit for each of the emission angles illustrated in FIG. 11. It was assumed here that light in the optical waveguide layer 20 attenuates according to exp ($-\alpha x$) where $\alpha$ is an inverse of the propagation length L and depends on the emission angle θ, and x represents a distance from a start end of the optical waveguide layer 20. The start end of the optical waveguide layer 20 is a part of the region having the length L1 illustrated in FIG. 8 that is in contact with the tip of the first optical waveguide 11. Meanwhile, a part of the region having the length L1 illustrated in FIG. 8 that is in contact with the tip of the second optical waveguide 12 is referred to as a terminal end of the optical waveguide layer 20. In the present example, the length L1 from the start end to the terminal end of the optical waveguide layer 20 was set to 1 mm. As illustrated in FIG. 12, a light intensity is easier to attenuate while the light propagates as the emission angle θ becomes smaller.

Figure 13:
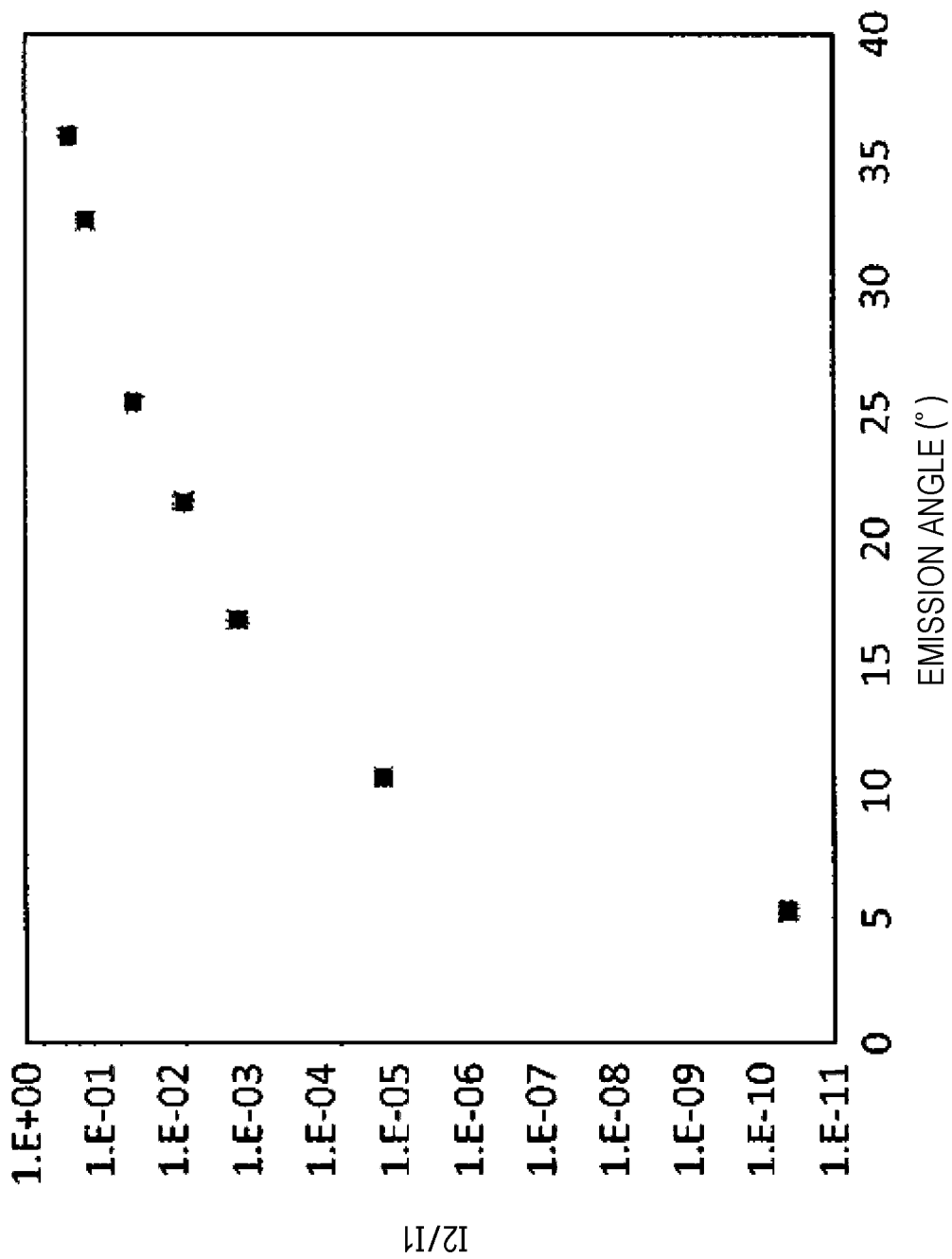
FIG. 13 is a view plotting a ratio I2/I1 for each of the emission angles.

FIG. 13 is a view plotting, for each of the emission angles, a ratio (I2/I1) of a light intensity I2 at the terminal end to a light intensity I1 at the start end of the optical waveguide layer 20 in the present example. The relationship illustrated in FIG. 13 is a relationship unique to the waveguide determined by a propagation angle of light propagating through the optical waveguide layer 20 and angle dependence of reflectance of the mirrors 30 and 40. By measuring the intensity ratio of I2 to I1, a propagation angle at the time can be calculated.

Figure 14:
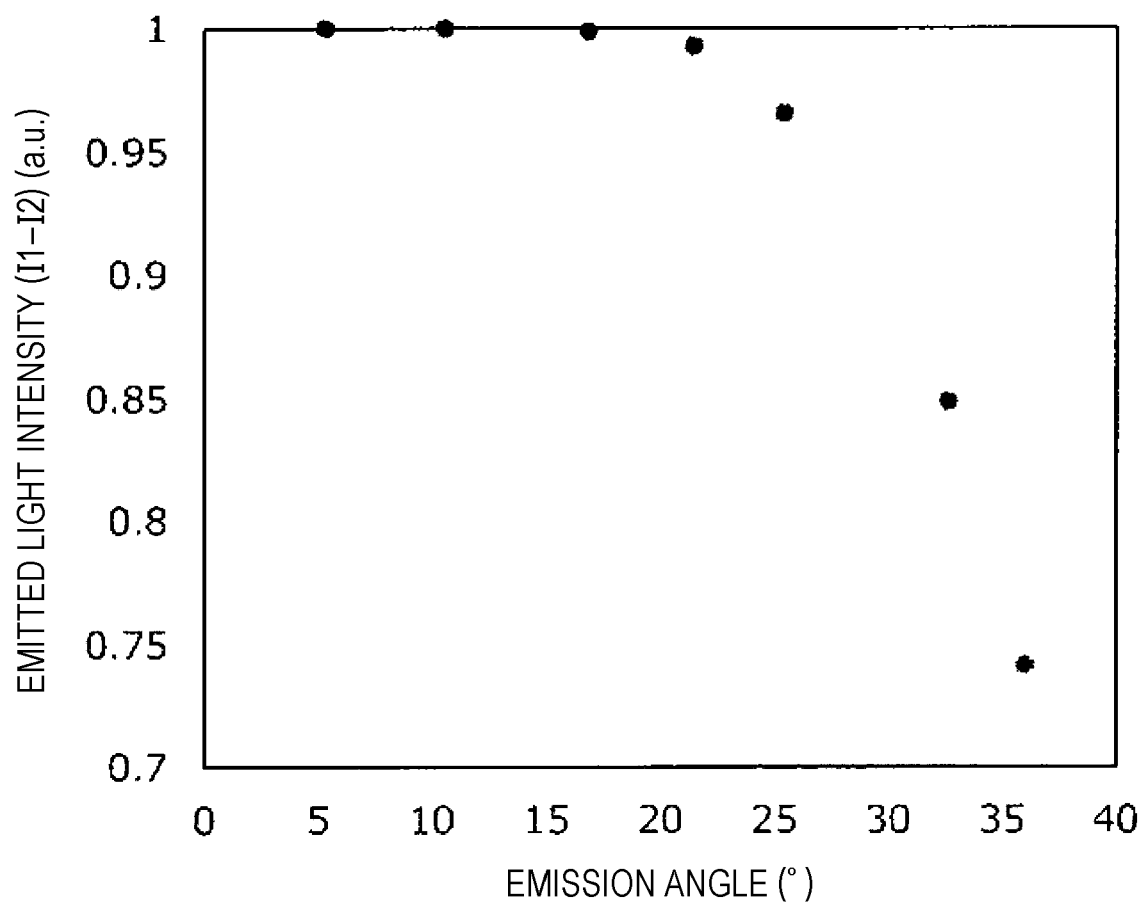
FIG. 14 is a view plotting, for each of the emission angles, a difference (I1−I2) between a light intensity I1 at a start end and a light intensity I2 at a terminal end.

FIG. 14 is a view plotting, for each of the emission angles, a difference (I1−I2) between the light intensity I1 at the start end and the light intensity I2 at the terminal end. An intensity difference between the I1 and I2 occurs since a part of light is released to an outside while the light propagates through the optical waveguide layer 20. For example, in the example of FIG. 14, at an emission angle 36°, the light intensity I2 at the terminal end of the optical waveguide layer 20 is approximately 26% of the light intensity I1 at the start end. For simplification, it is assumed that all of lost light in the optical waveguide layer 20 is emitted to an outside. In this case, for example, in a case where light of 1 W is input to the optical waveguide layer 20, light of approximately 0.74 W is released to an outside. Meanwhile, at an emission angle 25°, the light intensity I2 at the terminal end is approximately 3% of the light intensity I1 at the start end, and approximately 97% of light is released to an outside. In this case, by setting input light to approximately 0.76 W, light output of approximately 0.74 W can be obtained.

Figure 15:
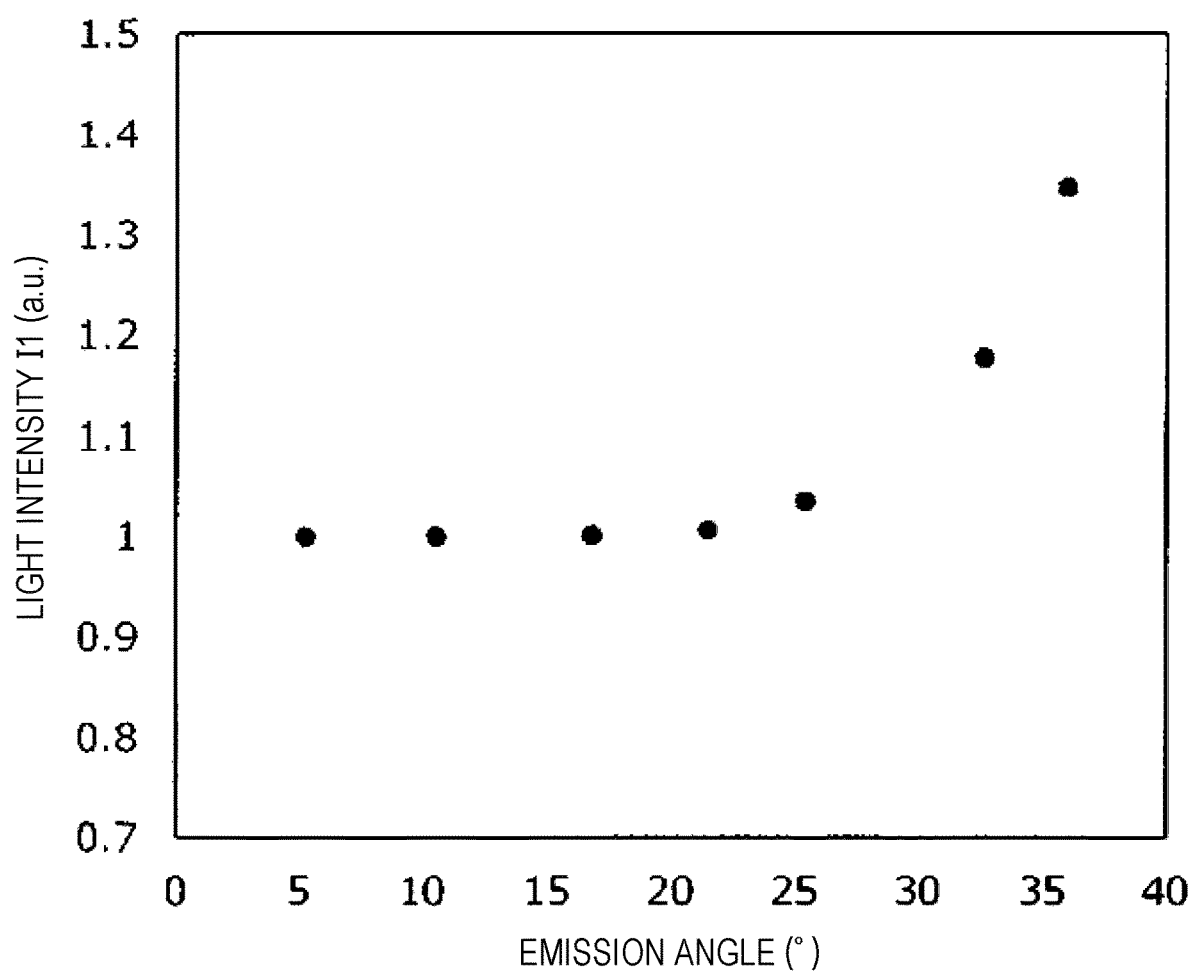
FIG. 15 illustrates an example of the adjusted light intensity I1.

FIG. 15 illustrates an example of the light intensity I1 adjusted in this example. The intensity I1 of input light is controlled to become larger as the emission angle becomes larger. By adjusting the intensity I1 as illustrated in FIG. 15, similar degrees of light intensities can be obtained at all emission angles. In an actual device, an absorption loss and a scattering loss of emitted light change in accordance with an emission angle. In a case where an intensity of input light is corrected in accordance with an angle as illustrated in FIG. 15, it is desirable to consider emission angle dependence of the absorption loss and the scattering loss.

In the present embodiment, data for correction is stored in advance in the storage device 166 of the driving device 160 illustrated in FIG. 10. The control circuit 162 decides a voltage Vpp applied to the optical waveguide layer 20 and a corrected value of an intensity of light emitted from the light source 130 from data of the intensities I1 and I2 by referring to the data.

The data for correction may be, for example, data in a table format such as the one illustrated in Table 1 below. Data of such a table is hereinafter referred to as "correction table" or "correction data".

TABLE 1

| angle (°) | intensity ratio (I2/I1) | applied voltage Vpp (V) | intensity difference (I1 − I2) | input correction I1/(I1 − I2) |
|---|---|---|---|---|
| 35 | 0.26 | 1 | 0.74 | 1.35000 |
| 30 | 0.15 | 5 | 0.85 | 1.18000 |

TABLE 1-continued

| angle (°) | intensity ratio (I2/I1) | applied voltage Vpp (V) | intensity difference (I1 − I2) | input correction I1/(I1 − I2) |
|---|---|---|---|---|
| 25 | 0.034 | 7 | 0.96 | 1.04000 |
| 20 | 0.0072 | 10 | 0.9928 | 1.00723 |
| 15 | 0.0013 | 15 | 0.9987 | 1.00133 |
| 10 | $1.4 \times 10^{-5}$ | 24 | 0.999986 | 1.00001 |
| 5 | $4.2 \times 10^{-11}$ | 40 | 0.999999 | 1.00000 |

Table 1 illustrates an example of a correction table used in a case where the emission angle is changed by 5° within a range of 5° to 35°. Data of the ratio (I2/I1), the applied voltage Vpp, the intensity difference (I1−I2), and an input correction value I1/(I1−I2) of the light source 130 are recorded for each angle. The relationship between the angle and the ratio (I2/I1) illustrated in Table 1 corresponds to the relationship illustrated in FIG. 13.

Figure 16:
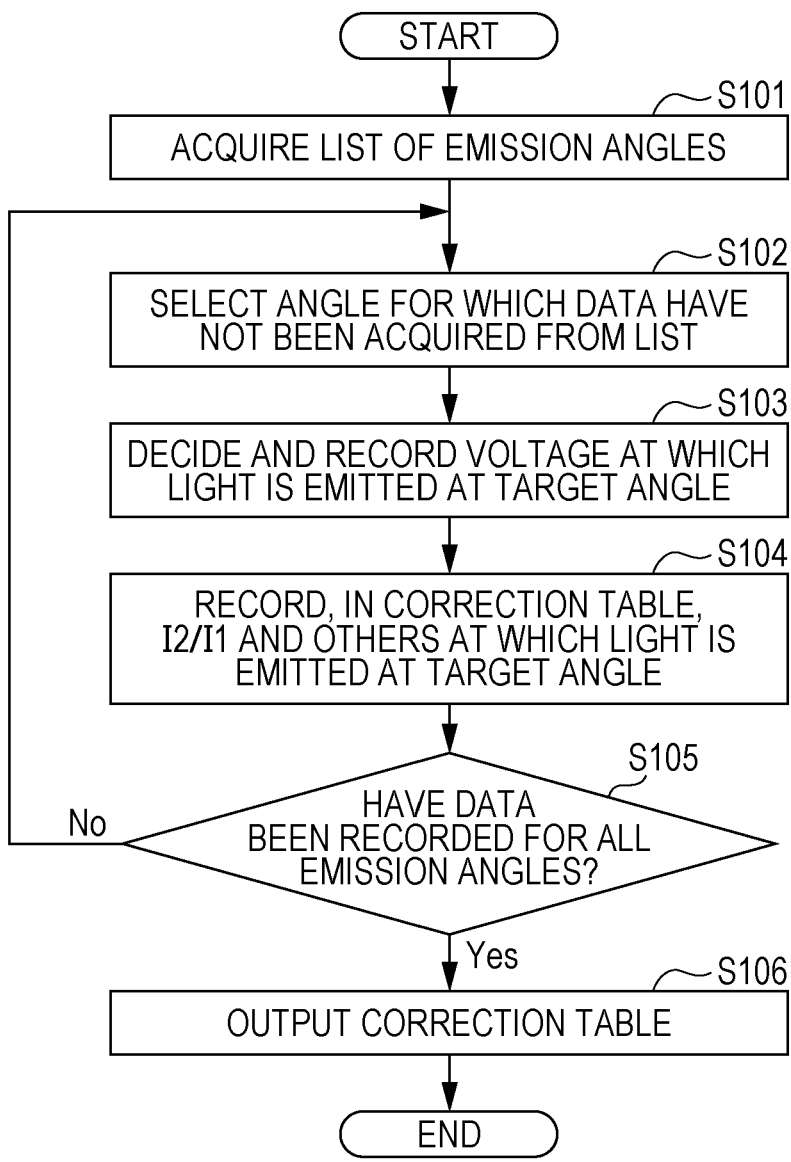
FIG. 16 is a flowchart illustrating an example of operation of generating data of a correction table.

FIG. 16 is a flowchart illustrating an example of operation of generating data of a correction table such as the one illustrated in Table 1. The operation illustrated in FIG. 16 is, for example, performed at a time of production of the light emitting device 100A, and a correction table is stored in advance in the storage device 166. The operation of FIG. 16 may be, for example, executed by the control circuit 162 of the driving device 160.

First, in step S101, the control circuit 162 acquires data indicative of a list of appropriate emission angles according to a use within an angular range necessary for beam scan. Although seven emission angles are set for simplification in the example of table 1, a larger number of emission angles may be set. For example, a large number of emission angles may be set at relatively small angular intervals such as 1° or 0.1° within a predetermined angular range.

The control circuit 162 repeats the operations in steps S102, S103, S104, and S105 until it is determined in step S106 that data have been recorded for all of the emission angles.

In step S102, the control circuit 162 selects, as a target emission angle, an angle for which data have not been acquired yet from the list of emission angles.

In step S103, the control circuit 162 decides a crest value of a voltage at which the target emission angle is obtained by gradually changing a voltage applied to the optical waveguide layer 20. The control circuit 162 records the value in the correction table in association with the emission angle. Note that an emission angle of light is measured by an emission angle measuring device (not illustrated). In step S104, the control circuit 162 acquires an intensity S1 detected by the first photodetector 171 and an intensity S2 detected by the second photodetector 172 when the target emission angle is obtained. Then, the control circuit 162 calculates an estimated light intensity I1 at the start end of the optical waveguide layer 20 and an estimated light intensity I2 at the terminal end of the optical waveguide layer 20 by calculation of I1=k1×S1 and I2=k2×S2 where k1 and k2 are preset proportionality coefficients. The control circuit 162 records the ratio (I2/I1), the difference (I1−I2), and the input correction value I1/(I1−I2) in the correction table in association with the emission angle. Although the value of the ratio (I2/I1) is recorded for each angle in the correction table illustrated in Table 1, a ratio of S1 and S2 may be recorded for each angle instead. I1 is proportional to S1, and I2 is proportional to S2. Therefore, in either case, data that defines a correspondence between a ratio of the first signal output from the first photodetector 171 and the second signal output from the second photodetector 172 and the emission angle is stored.

In step S105, the control circuit 162 determines whether or not data have been recorded for all of the angles included in the list of emission angles. In a case where there is an angle for which the data have not been recorded yet, the step S102 is performed again, and the operations in step S103 and S104 are executed for a different angle. In a case where the data have been recorded for all of the angles, step S106 is performed.

In step S106, the control circuit 162 outputs data of the generated correction table and records the data in the storage device 166.

The light emitting device 100A can be, for example, used in a LiDAR system. The control circuit 162 adjusts a voltage applied to the pair of electrodes 60A and 60B so that a predetermined scanning range is scanned by light. In this case, a correspondence between the applied voltage and an emission angle may undesirably change due to various factors such as a temperature of an environment in which the light emitting device 100A is disposed or aging deterioration of the light emitting device 100A. Furthermore, an intensity of emitted light may be undesirably different from a desired intensity.

In order to solve this problem, in the present embodiment, the following operation is performed, for example, at a time of activation of the light emitting device 100A or during scan operation. First, the control circuit 162 calculates a ratio (I2/I1) of the light intensity I2 calculated based on an output signal of the second photodetector 172 to the light intensity I1 calculated based on an output signal of the first photodetector 171 and a difference (I1−I2) between the light intensity I1 and the light intensity I2 every time the emission angle is changed. Next, the control circuit 162 specifies an emission angle corresponding to the calculated ratio (I2/I1) by referring to correction data recorded in advance in the storage device 166. In a case where there is an error between the intended emission angle and the emission angle specified from the correction data, the control circuit 162 compensates for the error by changing the applied voltage. Furthermore, in a case where there is an error between an emitted light intensity estimated from the calculated difference (I1−I2) and an intensity of light that should be emitted at the time, the control circuit 162 compensates for the error by changing the emitted light intensity of the light source 130. In a case where there is an error in the ratio (I2/I1) or the difference (I1−I2), the control circuit 162 updates the correction data.

Figure 17:
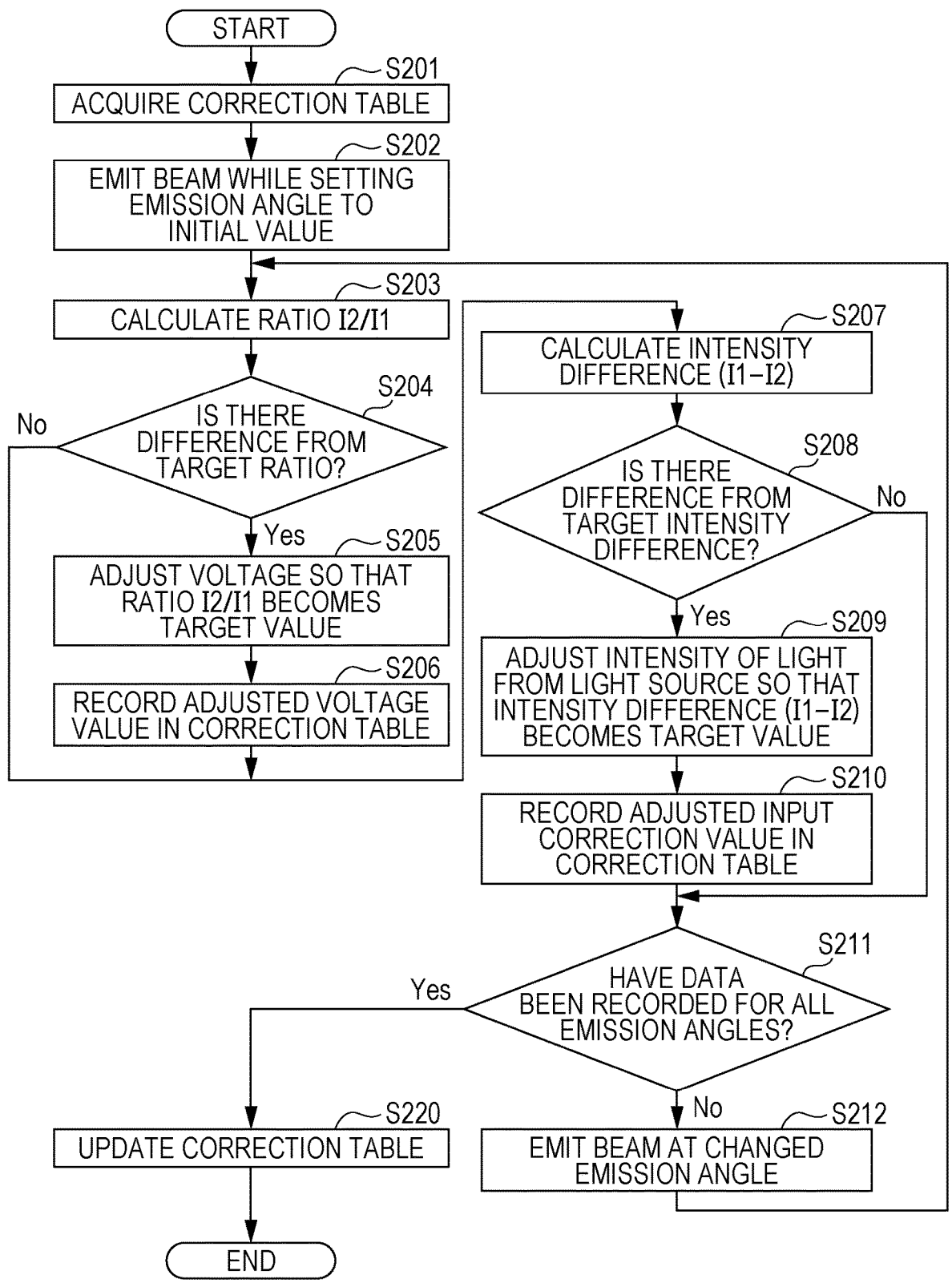
FIG. 17 is a flowchart illustrating an example of operation of a control circuit during beam scan operation of the light emitting device.

FIG. 17 is a flowchart illustrating an example of operation of updating the correction data by the light emitting device 100A.

In this example, in step S201, the control circuit 162 acquires data of a correction table that is recorded in advance.

In next step S202, the control circuit 162 causes a light beam to be emitted from a waveguide element while setting an emission angle to an initial value. In this case, the control circuit 162 decides output of the light source 130 on the basis of an input correction value corresponding to the emission angle in the correction table.

Then, the control circuit 162 repeats the operations in steps S203 to S212 until it is determined in step S211 that data acquisition has been completed for all of the emission angles.

In step S203, the control circuit 162 calculates the ratio I2/I1 on the basis of the light intensity I1 based on the output signal of the first photodetector 171 and the light intensity I2 based on the output signal of the second photodetector 172. In next step S204, the control circuit 162 determines whether or not there is a difference between the calculated ratio I2/I1 and a target ratio in the correction table. Whether or not there is a difference can be determined by determining whether or not the difference between the calculated ratio and the target ratio is larger than a predetermined threshold value. In a case where a result of the determination is Yes, step S205 is performed, and in a case where the result of the determination is No, step S207 is performed.

In step S205, the control circuit 162 adjusts a value of a voltage applied to the optical waveguide layer 20 so that the ratio I2/I1 becomes the target value. In next step S206, the control circuit 162 records the adjusted voltage value in the correction table.

In step S207, the control circuit 162 calculates an intensity difference (I1−I2). In next step S208, the control circuit 162 determines whether or not there is a difference between the calculated intensity difference and a target intensity difference in the correction table. Whether or not there is a difference can be determined by determining whether or not the difference between the calculated intensity difference and the target intensity difference is larger than a predetermined threshold value. In a case where a result of the determination is Yes, step S209 is performed, and in a case where the result of the determination is No, step S211 is performed.

In step S209, the control circuit 162 adjusts an intensity of light emitted from the light source 130 so that the intensity difference (I1−I2) becomes the target value. In this step, for example, the intensity of light from the light source 130 is adjusted so that (I2−I1)/I2 becomes uniform throughout the entire angular range. In next step S210, the control circuit 162 records the adjusted input correction value in the correction table.

Next, in step S211, the control circuit determines whether or not acquisition of data has been completed for all of the emission angles. In a case where a result of the determination is No, step S212 is performed, and in a case where the result of the determination is Yes, step S220 is performed.

In step S211, the control circuit 162 causes a light beam to be emitted from the waveguide element at a changed emission angle. In this case, the control circuit 162 decides output of the light source 130 on the basis of an input correction value corresponding to the emission angle in the correction table. Thereafter, the operations in steps S203 to S212 are repeated until data are acquired for all of the emission angles.

When data have been acquired for all of the emission angles, the control circuit 162 updates the correction table and records the updated correction table in the storage device 166 in step S220. In this step, items "applied voltage" and "input correction value" are updated, and items "angle", "ratio", and "intensity difference" are not updated among the items illustrated in Table 1.

Through the above operations, a direction and an intensity of emitted light can be properly controlled even in a case where a relationship between a voltage applied to the optical waveguide layer 20 and an emission angle and a relationship between a control command value input to the light source 130 and an intensity of emitted light change due to an environment or another factor. According to the present embodiment, a direction and an intensity of emitted light can be estimated without directly detecting a part of the emitted light by using an optical element such as a mirror or a beam splitter. Therefore, emission of light can be made appropriate with a simpler configuration.

Although the light emitting device 100A according to the present embodiment includes a single waveguide element 10, the light emitting device 100A may include an array of a plurality of waveguide elements 10. A target scene can be two-dimensionally scanned by giving a proper phase difference to light input to the optical waveguide layers 20 of the plurality of waveguide elements 10, as has been described with reference to FIGS. 1 to 6.

The present embodiment assumes that the relationship between the ratio I2/I1 and the emission angle illustrated in FIG. 13 does not change. However, this relationship changes in some cases due to various factors such as a change in environment or aging degradation. For example, in a case where the optical waveguide layer 20 is made of a liquid crystal material, the ratio I2/I1 decreases in some cases due to an increase in light absorption rate of the liquid crystal, that is, an increase in extinction coefficient caused by aging degradation.

Figure 18:
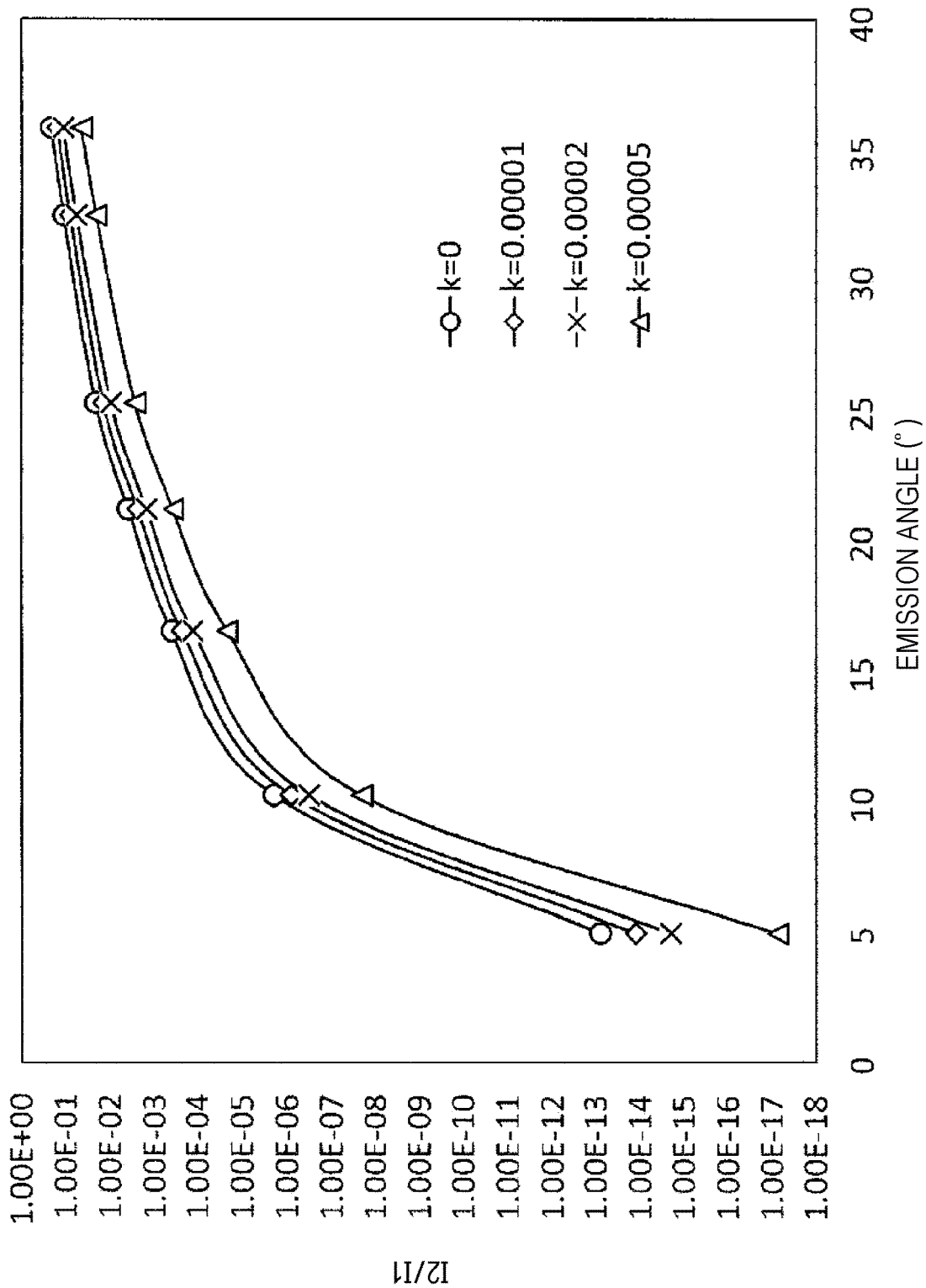
FIG. 18 illustrates an example of a change of a relationship between I2/I1 and an emission angle caused by a change of an extinction coefficient of a liquid crystal layer.

FIG. 18 illustrates an example of a change of I2/I1 caused by a change in extinction coefficient k of the liquid crystal. As illustrated in FIG. 18, when the extinction coefficient k of the liquid crystal changes, the relationship between the emission angle and I2/I1 changes. As the extinction coefficient k increases, the absorption loss increases and I2/I1 decreases. When the absorption loss of the optical waveguide layer 20 increases, there is a possibility that desired beam performance (e.g., a spread angle 0.17°) cannot be obtained.

In order to solve this problem, it is also possible to prepare a plurality of correction tables corresponding to degrees of degradation of liquid crystal in advance and select and use an optimum correction table from among these correction tables during operation. In such an embodiment, a light emitting device includes a measurement device that measures light transmittance of the optical waveguide layer 20 during operation. An example of such an embodiment is described below.

Figure 19:
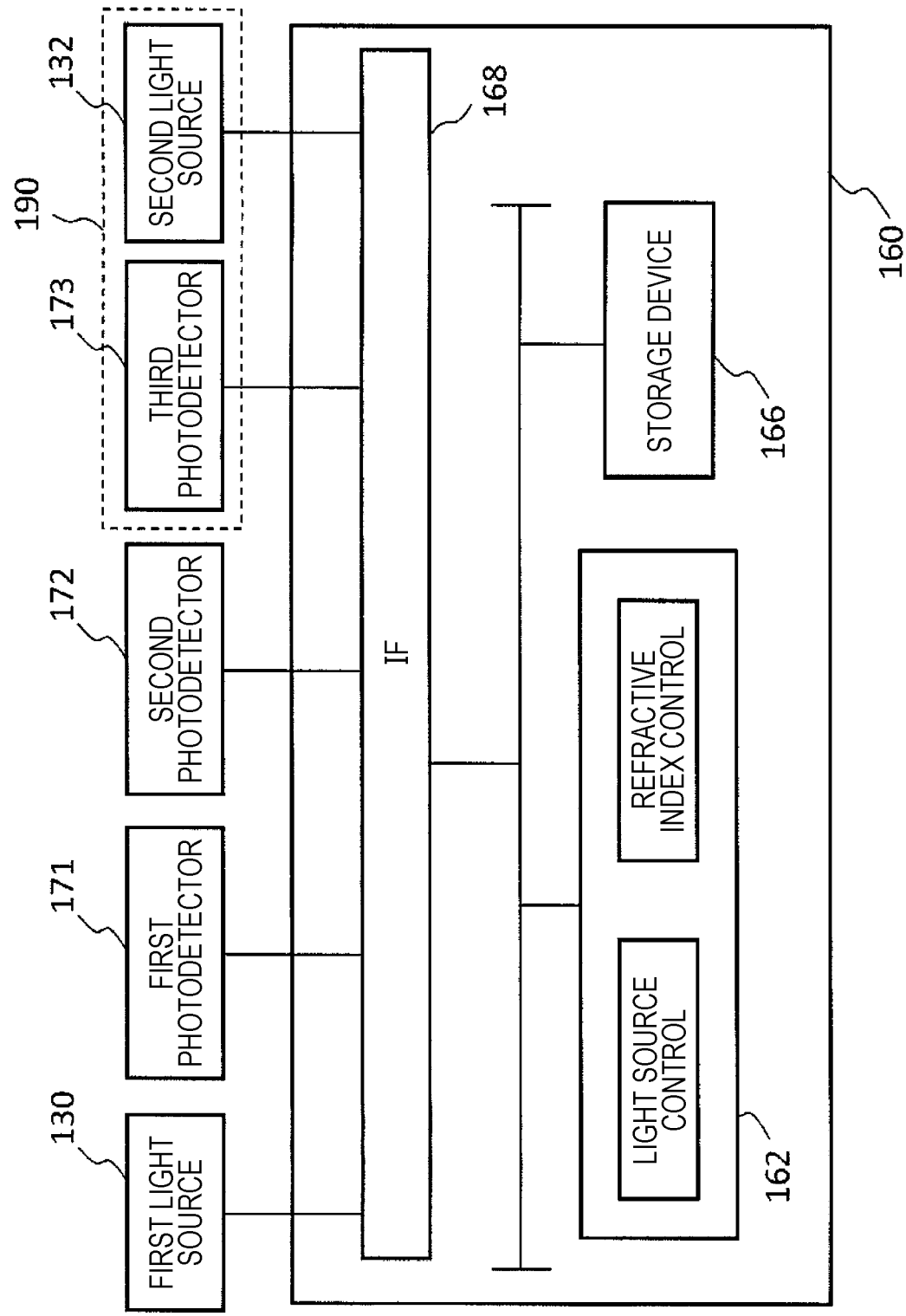
FIG. 19 is a block diagram illustrating a configuration of a light emitting device according to another embodiment.

FIG. 19 is a block diagram illustrating an example of a configuration of a light emitting device including a measurement device 190 that measures light transmittance of the optical waveguide layer 20. Constituent elements except the measurement device 190 of the light emitting device illustrated in FIG. 19 are identical to those illustrated in FIG. 10. Note that the light source 130 is referred to as a "first light source 130" in the present embodiment. The measurement device 190 includes a second light source 132 and a third photodetector 173.

Figure 20:
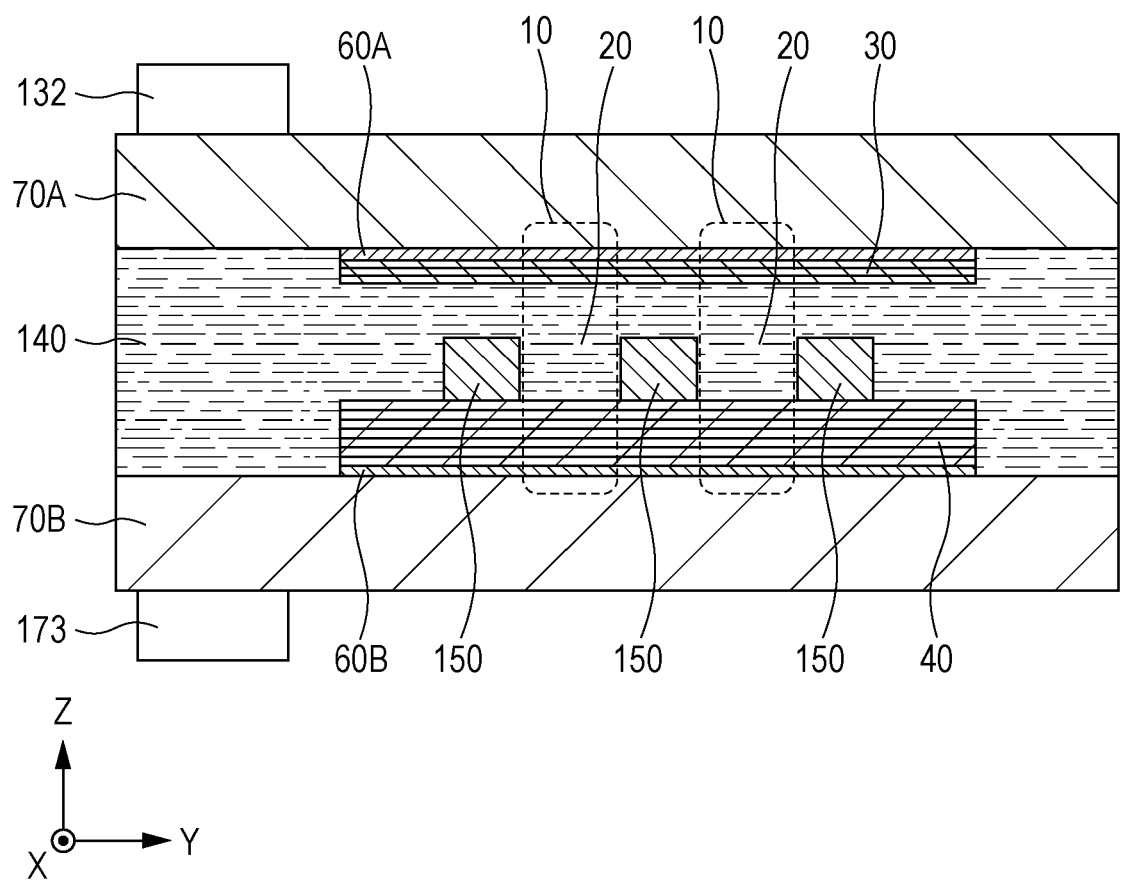
FIG. 20 is a cross-sectional view illustrating a configuration of a light emitting device according to the other embodiment.

FIG. 20 illustrates a cross section of the light emitting device according to the present embodiment that is parallel with the YZ plane. In this light emitting device, a first electrode 60A, a first mirror 30, a plurality of spacers 150, a second mirror 40, and a second electrode 60B are disposed in this order between a first substrate 70A and a second substrate 70B that face each other. The first electrode 60A is in contact with a part of the first substrate 70A, and the first mirror 30 is in contact with the first electrode 60A. The second electrode 60B is in contact with a part of the second substrate 70B, and the second mirror 40 is in contact with the second electrode 60B. The plurality of spacers 150 are in contact with the second mirror 40, and are arranged in the Y direction so as to be apart from one another and extend in the X direction. There is a gap between the first mirror 30 and the spacers 150. A space between the first substrate 70A and the second substrate 70B including a space between the first mirror 30 and the second mirror 40 is filled with a liquid crystal material. A layer filled with this liquid crystal material is referred to as a liquid crystal layer 140. An optical waveguide layer 20 according to the present embodiment is a part of the liquid crystal layer 140. The optical waveguide layer 20 is provided in a region partitioned by the first mirror 30, the second mirror 40, and two spacers 150 adjacent in the Y direction. It can be said that the structure illustrated in FIG. 20 is a structure in which a plurality of (two in the example of FIG. 20) waveguide elements 10 are arranged in the Y direction. Each of the waveguide elements 10 has a structure in which the first electrode 30, the first mirror 30, the optical waveguide layer 20, the second mirror 40, and the second electrode 60B are laminated in this order. The first electrode 30, the first mirror 30, the second mirror 40, and the second electrode 40 are shared by these waveguide elements 10. Each of the spacers 150 is a dielectric member that functions as a partition wall between two optical waveguide layers 20 adjacent in the Y direction. The spacers 150 may be in contact with the first mirror 30.

The light emitting device according to the present embodiment includes the second light source 132 and the third photodetector 173. The second light source 132 and the third photodetector 173 are located so as to face each other with the first substrate 70A, the liquid crystal layer 140, and the second substrate 70B interposed therebetween. The second light source 132 includes a light-emitting element that emits light toward the liquid crystal layer 140. The third photodetector 173 includes a light-receiving element that detects light emitted from the second light source 132.

In the present embodiment, plural kinds of correction data corresponding to a plurality of extinction coefficients are recorded in advance in the storage device 166 in order to compensate for influence of an increase in light absorption rate resulting from degradation of the liquid crystal layer 140. The correction data can be acquired by calculation by changing an extinction coefficient on a calculator, for example, on the basis of correction data at a time of shipment. Light transmittance of a part of the liquid crystal layer 140 continuous with the optical waveguide layer 20 is measured by using the second light source 132 and the third photodetector 173. Note that the part of the liquid crystal layer 140 for which light transmittance is measured and the optical waveguide layer 20 may be separate from each other as long as a degradation condition similar to the optical waveguide layer 20 is satisfied.

Figure 21:
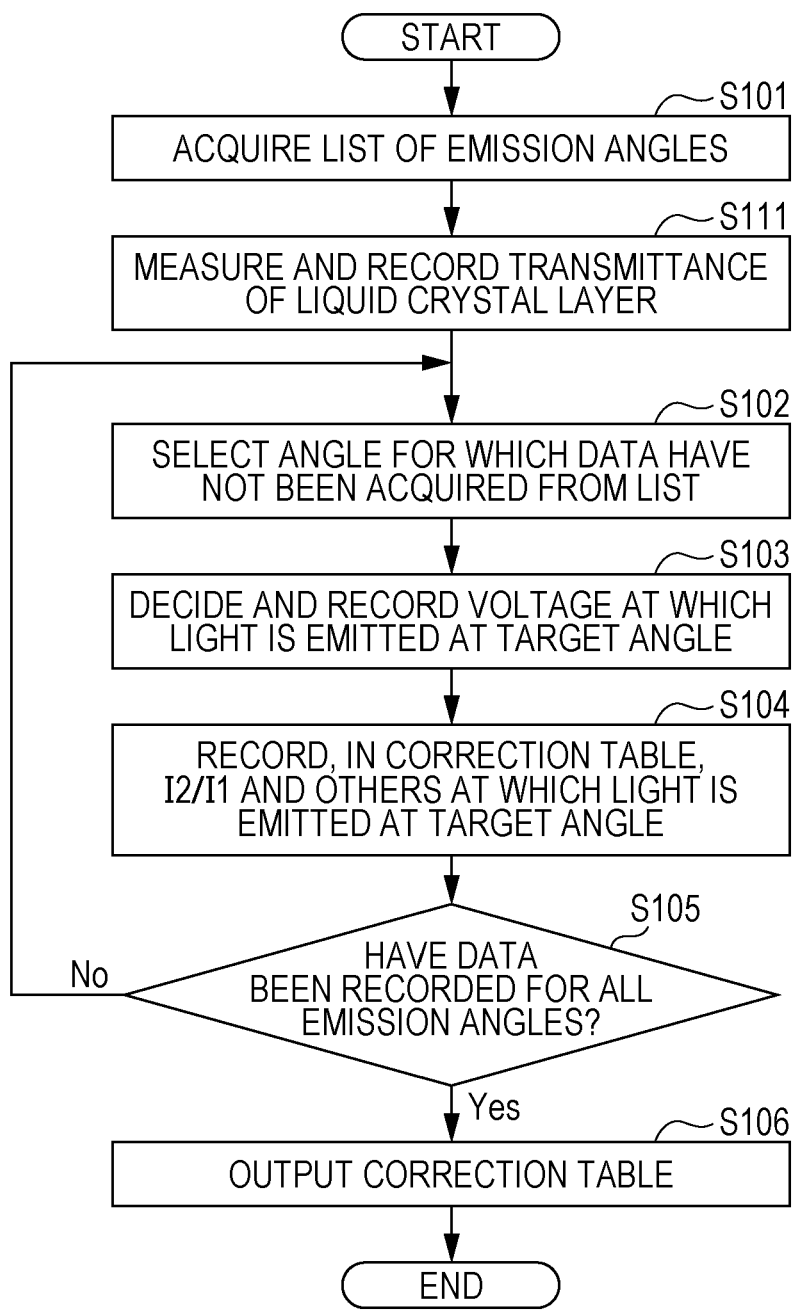
FIG. 21 is a flowchart illustrating an example of processing for generating correction data according to the other embodiment.

FIG. 21 is a flowchart illustrating an example of correction data generation processing according to the present embodiment. The flowchart illustrated in FIG. 21 is basically identical to the flowchart illustrated in FIG. 16 except for that step S111 is added after step S101 and step S102. In step S111, the control circuit 162 measures transmittance of the liquid crystal layer 140 by using the second light source 132 and the third photodetector 173 and records the measured transmittance in the storage device 166. More specifically, the control circuit 162 causes the second light source 132 to emit light of an intensity P1 and causes the third photodetector 173 to detect the light. The transmittance of the liquid crystal layer 140 can be calculated on the basis of a ratio of an intensity P2 of the light detected by the third photodetector 173 and the intensity P1 designated for the second light source 132. Note that step S111 may be performed before step S101.

The operations in steps S102 to S105 are identical to the corresponding operations illustrated in FIG. 16. In the present embodiment, in step S106, the transmittance recorded in step S111 and correction data such as the one illustrated in Table 1 are recorded in association with each other. Furthermore, the extinction coefficient is changed to plural values on the basis of this correction data on a calculator, and plural kinds of transmittance or extinction coefficients and correction data such as the one illustrated in Table 1 are recorded in association with each other. In this way, the control circuit 162 generates correction data corresponding to the plural kinds of transmittance or extinction coefficients and causes the correction data to be recorded in the storage device 166.

Figure 22:
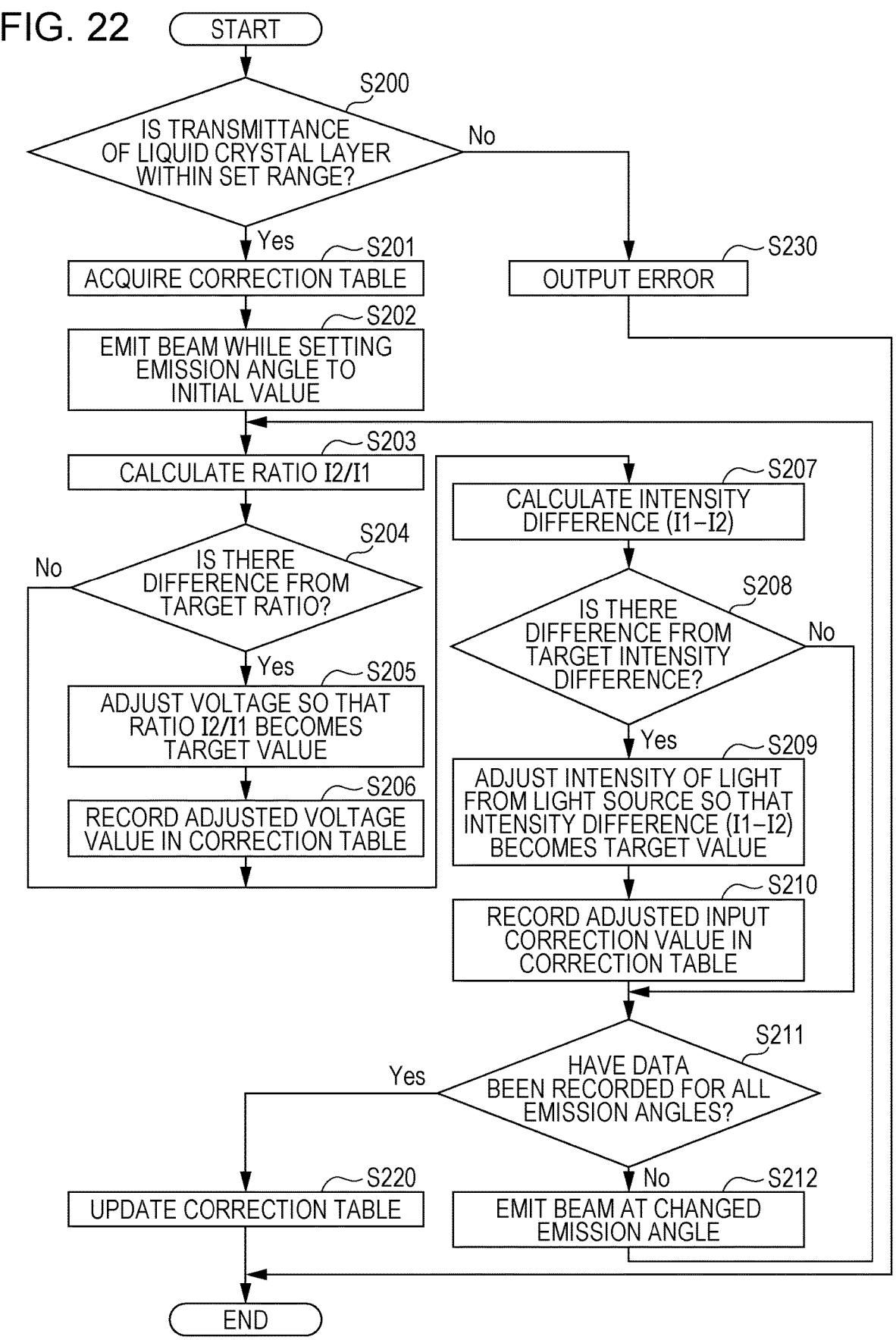
FIG. 22 is a flowchart illustrating an example of processing for updating the correction data according to the other embodiment.

FIG. 22 is a flowchart illustrating an example of operation of updating correction data in the present embodiment. The flowchart illustrated in FIG. 22 is basically identical to the flowchart illustrated in FIG. 17 except for that step S200 and S230 are added. In this example, first, in step S200, the control circuit 162 measures light transmittance of the liquid crystal layer 140 and determines whether or not this value is within a preset range. In a case where a result of the determination is No, step S230 is performed, in which an error is output, and then the operation ends. In a case where the result of the determination in step S200 is Yes, the operations in steps S201 to S220 are executed as in the example of FIG. 17. In step S201, data of correction table corresponding to transmittance closest to the measured transmittance is acquired from among the data of the plurality of correction tables recorded in advance.

In the example of FIG. 22, the error output process in step S230 is added in consideration of influence on a spread angle of a light beam. For example, in a structure used for calculation of the relationship illustrated in FIG. 13, in a case where the transmittance of the liquid crystal layer 140 decreases by 0.14% (corresponding to an extinction coefficient k=0.00005 in a case of a liquid crystal layer of 2 μm), a scan range for which a beam spread angle of 0.17° can be kept decreases to approximately 10 degrees. In a case where such a remarkable decrease in transmittance is detected, it is desirable to stop the operation and notify a system or a user about an abnormality of the liquid crystal layer 140. In view of this, in the example of FIG. 22, transmittance of the liquid crystal layer 140 is first measured, and in a case where the transmittance of the liquid crystal has decreased beyond a preset range, the correction operation is stopped, and an error is output. This can provide a more reliable light emitting device.

In the above embodiments, both of a direction and an intensity of emitted light are adjusted on the basis of the first signal output from the first photodetector 171 and the second signal output from the second photodetector 172. However, the present disclosure is not limited to such embodiments. Only one of a direction and an intensity of emitted light may be adjusted on the basis of the first signal and the second signal. Furthermore, control of a direction of emitted light may be realized by a method different from the method of controlling a refractive index of the optical waveguide layer 20. For example, a direction of emitted light may be controlled by changing a thickness of the optical waveguide layer 20. Alternatively, a direction of emitted light may be controlling by changing a wavelength of light emitted from the light source 130.

Although the correction data illustrated in Table 1 is used in the above embodiments, the correction data need not necessarily be data of the same format as Table 1. For example, correction data that defines only a correspondence between a ratio of the first signal and the second signal and an emission angle may be used. In this case, an intensity of light output from the light source 130 is not adjusted, and only a voltage applied to the optical waveguide layer 20 is adjusted.

Example of Materials

Next, an example of materials that can be used for the constituent elements in the embodiments of the present disclosure is described.

A dielectric multi-layer may be, for example, used as a material for the mirrors 30 and 40. A mirror using a multi-layer can be, for example, produced by periodically forming a plurality of films each having an optical thickness of ¼ wavelength and having different refractive indexes. According to such a multi-layer mirror, high reflectance can be obtained. The films may be, for example, made of $SiO_2$, $TiO_2$, $Ta_2O_5$, Si, SiN, or the like. Each mirror is not limited to a multi-layer mirror and may be made of a metal such as Ag or Al.

Various materials having electric conductivity can be used for the electrodes and wires. For example, a metal material such as Ag, Cu, Au, Al, Pt, Ta, W, Ti, Rh, Ru, Ni, Mo, Cr, or Pd, an inorganic compound such as ITO, tin oxide, zinc oxide, indium zinc oxide (IZO: registered trademark), or strontium ruthenate (SRO), or an electrically-conductive material such as PEDOT (3,4-ethylenedioxythiophene) or an electrically-conductive polymer such as polyaniline can be used. A transparent electrically-conductive material can be used for an electrode that needs light transmissivity.

Various light-transmissive materials such as a dielectric body, a semiconductor, an electro-optic material, and liquid crystal molecules can be used for the optical waveguide layer. Examples of the dielectric body include $SiO_2$, $TiO_2$, $Ta_2O_5$, SiN, and AlN. Examples of the semiconductor material include Si-based, GaAs-based, and GaN-based materials. Examples of the electro-optic material include lithium niobate ($LiNbO_3$), barium titanate ($BaTi_3$), lithium tantalate ($LiTaO_3$), zinc oxide (ZnO), lead lanthanum zirconate titanate (PLZT), and potassium tantalate niobate (KTN).

Examples of a method for modulating a refractive index of the optical waveguide layer include various methods using a carrier injection effect, an electro-optic effect, a birefringence effect, and a thermooptic effect.

The method using a carrier injection effect can be realized by a configuration using a pin junction of a semiconductor. In this method, a structure in which a semiconductor of a low doping concentration is sandwiched between a p-type semiconductor and an n-type semiconductor is used, and a refractive index is modulated by injecting a carrier into the semiconductor. According to this configuration, the optical waveguide layer in each of the waveguide elements 10 contains a semiconductor material. One of the pair of electrodes can contain a p-type semiconductor, and the other one of the pair of electrodes can contain an n-type semiconductor. The driving device injects a carrier into the semiconductor material by applying a voltage to the pair of electrodes and thereby changes a refractive index of the optical waveguide layer. It is also possible to produce the optical waveguide layer from a non-doped semiconductor or a semiconductor of a low doping concentration and provide a p-type semiconductor and an n-type semiconductor in contact with this semiconductor. It is also possible to employ a complex configuration in which a p-type semiconductor and an n-type semiconductor are disposed in contact with a semiconductor of a low doping concentration and an electrically conductive material is disposed in contact with the p-type semiconductor and the n-type semiconductor. For example, when approximately $10^{20}$ $cm^{-3}$ carriers are injected into Si, a refractive index of Si changes by approximately 0.1 (see, for example, "Free charge carrier induced refractive index modulation of crystalline Silicon" 7th IEEE International Conference on Group IV Photonics, P102-104, 1-3 Sep. 2010). In a case where this method is employed, a p-type semiconductor and an n-type semiconductor can be used as materials of the pair of electrodes. Alternatively, the electrodes may be made of a metal, and layers between the electrodes and the optical waveguide layer or the optical waveguide layer itself may contain a p-type or n-type semiconductor.

The method using an electro-optic effect can be realized by applying an electric field over an optical waveguide layer containing an electro-optic material. In particular, in a case where KTN is used as the electro-optic material, a large electro-optic effect can be obtained. Since relative permittivity of KTN remarkably rises at a temperature slightly higher than a phase transition temperature from a tetragonal crystal to a cubic crystal, this effect can be used. For example, according to "Low-Driving-Voltage Electro-Optic Modulator With Novel KTa1−xNbxO3 Crystal Waveguides" Jpn. J. Appl. Phys., Vol. 43, No. 8B (2004), an electro-optic constant $g=4.8\times10^{-15}$ m$^2$/V$^2$ is obtained for light of a wavelength 1.55 μm. Accordingly, for example, when an electric field of 2 kV/mm is applied, the refractive index changes by approximately 0.1 ($=gn^3E^3/2$). As described above, according to a configuration using the electro-optic effect, the optical waveguide layer in each of the waveguide elements 10 contains an electro-optic material such as KTN. The driving device can change a refractive index of the electro-optic material by applying a voltage to the pair of electrodes.

In the method using a birefringence effect of liquid crystal, refractive index anisotropy of liquid crystal can be changed by driving an optical waveguide layer containing a liquid crystal material by a pair of electrodes. This can modulate a refractive index for light propagating through the optical waveguide layer. Since liquid crystal generally has a birefringence difference of approximately 0.1 to 0.2, a refractive index change equivalent to the birefringence difference can be obtained by changing an orientation direction of the liquid crystal. As described above, according to a configuration using a birefringence effect of liquid crystal, the optical waveguide layer in each of the waveguide elements 10 contains a liquid crystal material. The driving device can change refractive index anisotropy of the liquid crystal material by applying a voltage to the pair of electrodes and thereby change a refractive index of the optical waveguide layer.

The thermooptic effect is an effect that a refractive index changes as a temperature of a material changes. A refractive index may be modulated by heating an optical waveguide layer containing a thermooptic material in order to perform driving using the thermooptic effect.

A thickness of the optical waveguide layer may be changed instead of changing a refractive index of the optical waveguide layer. For example, an actuator may be connected to at least one of the pair of mirrors. The actuator can be, for example, any of various actuators using electrostatic force, electromagnetic induction, a piezoelectric material, a shape-memory alloy, and heat. In a configuration using electrostatic force, an actuator moves a mirror by using attractive force or repulsive force generated between electrodes by the electrostatic force. The actuator may drive a mirror by using electromagnetic induction that generates attractive force or repulsive force in a magnetic body in a coil. In an actuator using a piezoelectric material, a shape-memory alloy, or thermal deformation, a phenomenon that a material is deformed by externally applied energy is used. For example, lead zirconate titanate (PZT), which is a representative piezoelectric material, stretches and contracts upon application of an electric field in a direction of polarization. A distance between the pair of mirrors can be directly changed by a piezoelectric material. A change amount may be increased by using a configuration called unimorph or bimorph in order to obtain a sufficient mirror moving distance.

Application Examples

Next, application examples of the light emitting device are described.

Figure 23:
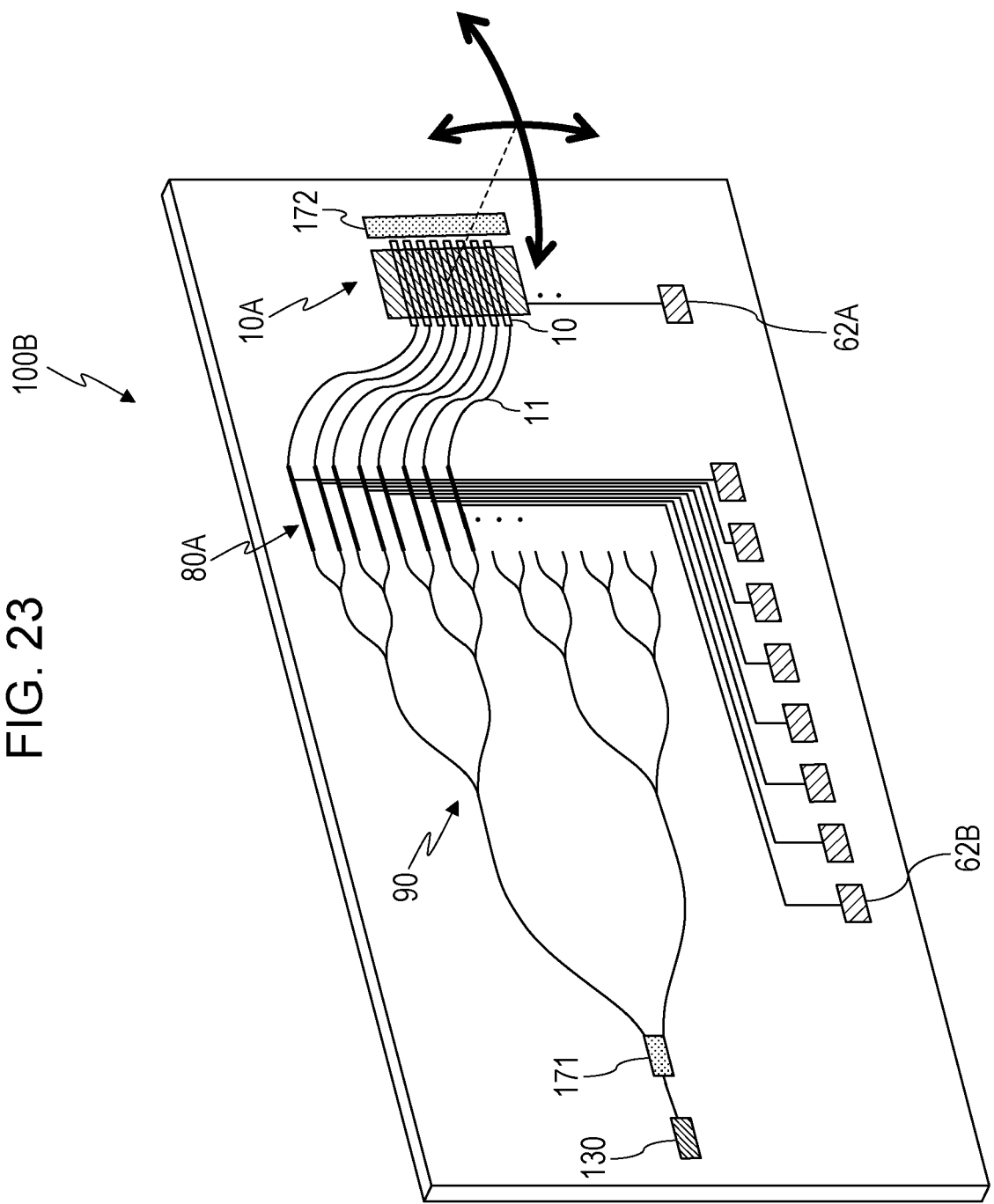
FIG. 23 illustrates another example of a configuration of the light emitting device.

FIG. 23 illustrates an example of a configuration of a light emitting device 100B in which elements such as the optical divider 90, the waveguide array 10A, the phase shifter array 80A, and the light source 130 are integrated on a circuit substrate (e.g., a chip). The light source 130 can be, for example, a light-emitting element such as a semiconductor laser element. The light source 130 in this example emits single-wavelength light whose wavelength in a free space is λ. The optical divider 90 divides light from the light source 130 and introduces the divided light beams into waveguides in a plurality of phase shifters. In the example illustrated in FIG. 23, a single electrode 62A and a plurality of electrodes 62B are provided on the chip. A control signal is supplied to the waveguide array 10A from the electrode 62A. Control signals are sent to the plurality of phase shifters 80 in the phase shifter array 80A from the plurality of electrodes 62B, respectively. The electrode 62A and the electrode 62B are connectable to a control circuit (not illustrated) that generates the control signals. The control circuit may be provided on the chip illustrated in FIG. 23 or may be provided on another chip in the light emitting device 100B. The control circuit may be connected to the light source 130 and control a wavelength or an intensity of light emitted from the light source 130.

The waveguide array 10A is a collection of a plurality of waveguide elements 10 arranged in a direction crossing a direction in which the waveguide elements 10 extend. Each of the waveguide elements 10 has a similar configuration to the waveguide elements 10 in the above embodiments. Specifically, each of the waveguide elements 10 includes a first mirror that is light transmissive, a second mirror that faces the first mirror, and an optical waveguide layer located between the first mirror and the second mirror. Each of the waveguide elements 10 allows light input to the optical waveguide layer to propagate along the first direction and to be emitted through the first mirror. The light emitting device 100B includes a plurality of first optical waveguides 11 connected to the respective optical waveguide layers of the plurality of waveguide elements 10. The plurality of first optical waveguides 11 are connected to the phase shifter array 80A. The light source 130 emits light to be input to the plurality of first optical waveguides 11.

The light emitting device 100B illustrated in FIG. 23 further includes the first photodetector 171 and the second photodetector 172. The first photodetector 171 is disposed close to the light source 130 and outputs a first signal indicative of an intensity of light emitted from the light source 130. The second photodetector 172 is disposed close to terminal ends of the optical waveguide layers in the waveguide array 10A. In this example, a single first photodetector 171 and a single second photodetector 172 are disposed for the plurality of waveguide elements 10. The second photodetector 172 may have a configuration of an image sensor so as to be capable of collectively detecting light that has passed the plurality of waveguide elements 10. According to such a configuration, the above control can be performed on the waveguide elements 10 without providing a large number of photodetectors. Note that the positions of the first photodetector 171 and the second photodetector 172 are not limited to those in this example. The first photodetector 171 may be disposed at any position as long as the first photodetector 171 is disposed so as to detect light at any point on a path from the light source 130 to the plurality of waveguide elements 10. Similarly, the second photodetector 172 may be disposed at any position as long as the second photodetector 172 is disposed so as to detect light that has passed the optical waveguide layers of the plurality of waveguide elements 10. Furthermore, a plurality of first photodetectors may be provided in a stage followed by the plurality of waveguide elements 10, and a plurality of second photodetectors may be provided in a stage following the plurality of waveguide elements 10.

By integrating all components on a chip as illustrated in FIG. 23, light scan in a wide range can be realized by a small-sized device. For example, all of the components illustrated in FIG. 23 can be integrated on a chip of approximately 2 mm×1 mm.

Figure 24:
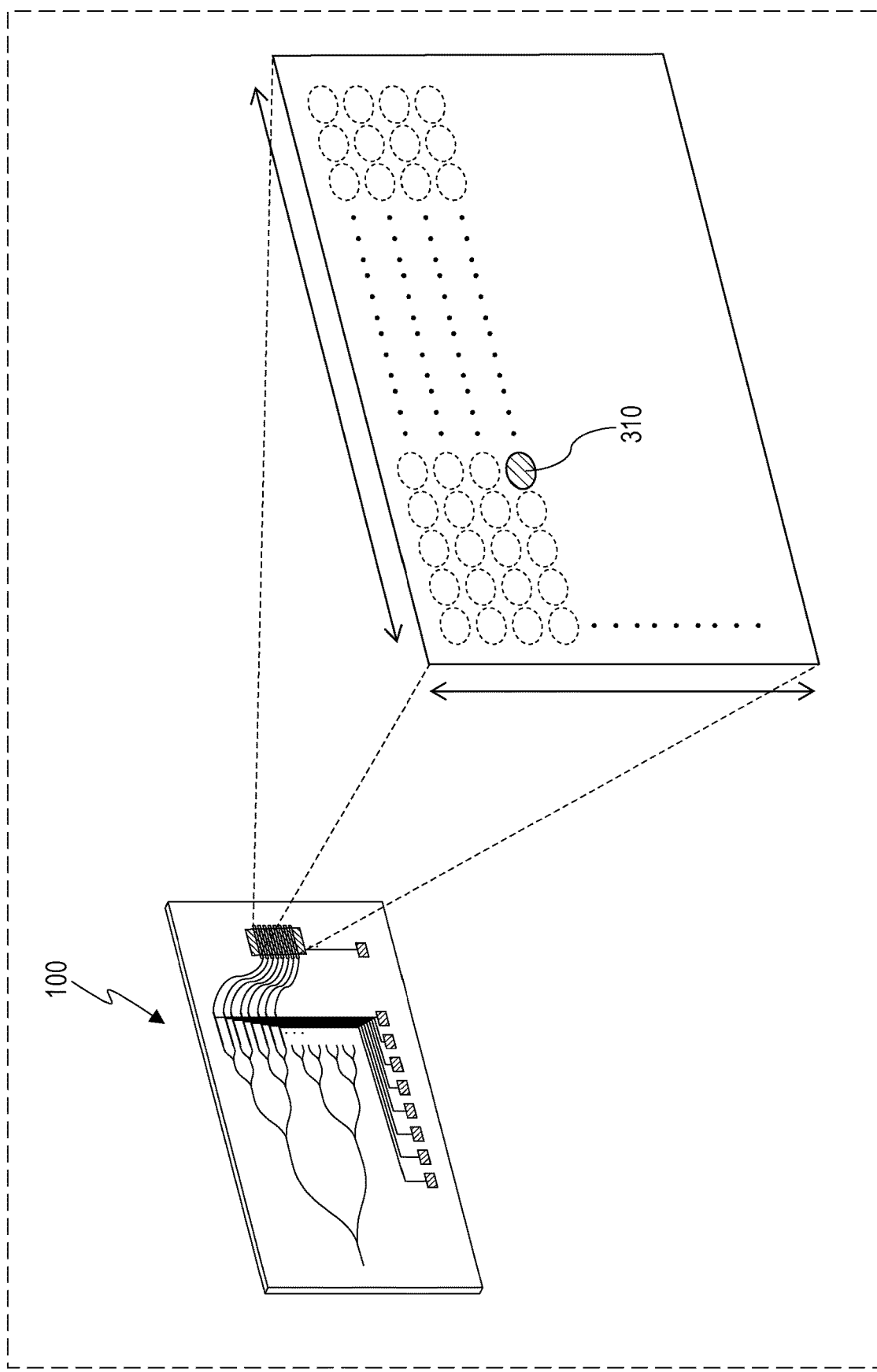
FIG. 24 is a schematic view illustrating a state where two-dimensional scan is being executed by emitting a light beam to a place far from the light emitting device.

FIG. 24 is a schematic view illustrating a state where two-dimensional scan is being executed by emitting a light beam such as a laser to a place far from the light emitting device 100. The two-dimensional scan is executed by moving a beam spot 310 in horizontal and vertical directions. For example, a two-dimensional ranging image can be acquired by combination with a known time of flight (TOF) method. The TOF method is a method for calculating a flight time of light by emitting a light beam and observing light reflected by an object and thereby finding a distance.

Figure 25:
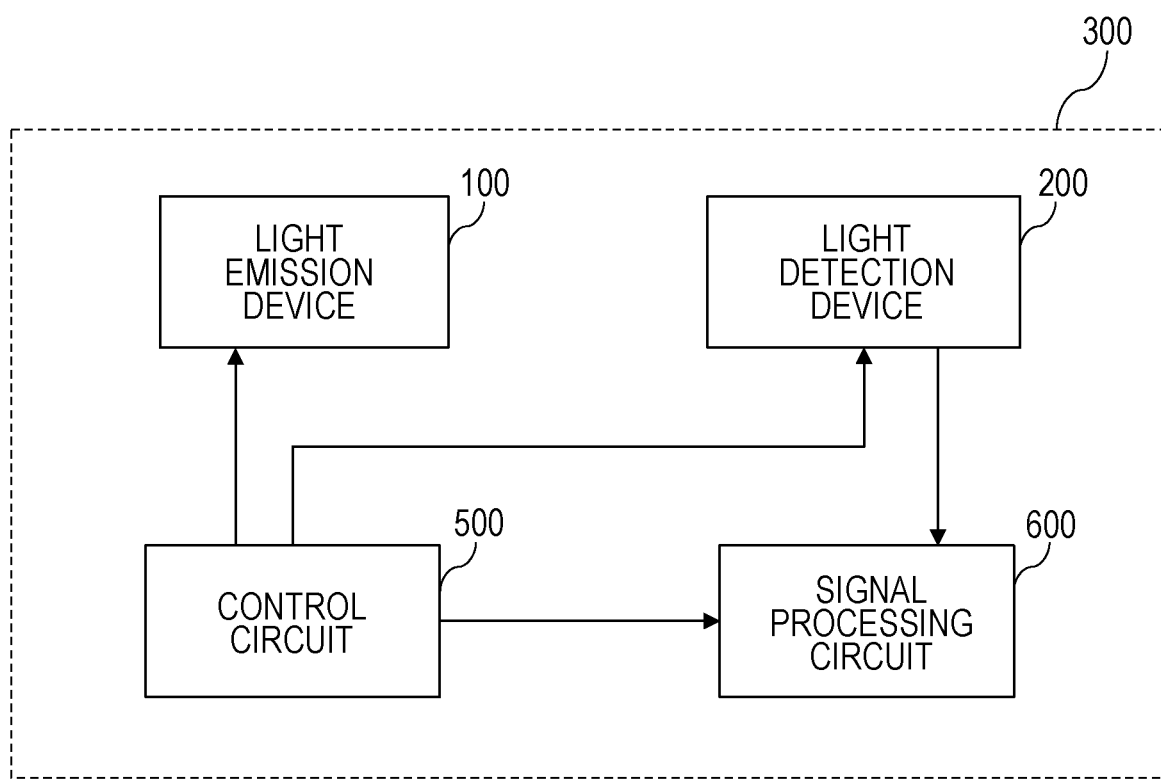
FIG. 25 is a block diagram illustrating an example of a configuration of a light detection system.

FIG. 25 is a block diagram illustrating an example of a configuration of a light detection system 300. The light detection system 300 can be, for example, used as a LiDAR system that generates a ranging image. The light detection system 300 includes the light emitting device 100, a light detection device 200, a control circuit 500, and a signal processing circuit 600. The light detection device 200 detects light emitted from the light emitting device 100 and reflected by an object in a target scene. The light detection device 200 can be, for example, realized by an image sensor having sensitivity at the wavelength λ of light emitted from the light emitting device 100. The light detection device 200 includes a plurality of light-receiving elements aligned along a light-receiving surface. Each of the light-receiving elements outputs an electric signal corresponding to an amount of received light. The signal processing circuit 600 calculates a distance to a target on the basis of electric signals output from the light-receiving elements of the light detection device 200 and thus generates distance distribution data. The distance distribution data is, for example, data indicative of a two-dimensional distribution of distances. The control circuit 500 is a processor that controls the light emitting device 100, the light detection device 200, and the signal processing circuit 600. The control circuit 500 controls a timing of irradiation of a light beam from the light emitting device 100 and timings of exposure and signal readout of the light detection device 200, and instructs the signal processing circuit 600 to generate a ranging image.

In two-dimensional scan, a frame rate at which a ranging image is acquired can be, for example, selected from among 60 fps, 50 fps, 30 fps, 25 fps, 24 fps, and the like, which are often used as a frame rate of a typical moving image. In consideration of application to an on-board system, as the frame rate increases, a frequency of acquisition of a ranging image increases, and an obstacle can be detected more precisely. For example, during travelling at 60 km/h, in a case where the frame rate is 60 fps, an image can be acquired every time a car moves by approximately 28 cm. In a case where the frame rate is 120 fps, an image can be acquired every time the car moves by approximately 14 cm. In a case where the frame rate is 180 fps, an image can be acquired every time the car moves by approximately 9.3 cm.

A time required to acquire a single ranging image depends on a speed of beam scan. For example, in order to acquire an image having 100×100 resolution points at 60 fps, it is necessary to perform beam scan in 1.67 µs or less for each point. In this case, the control circuit 500 controls emission of a light beam by the light emitting device 100 and signal accumulation and readout by the light detection device 200 at an operation speed of 600 kHz.

As described above, a light emitting device according to an embodiment of the present disclosure includes a waveguide element, a first photodetector, and a second photodetector. The waveguide element includes a first mirror that is light transmissive, a second mirror that faces the first mirror, and an optical waveguide layer located between the first mirror and the second mirror, and allows light input to the optical waveguide layer to propagate along a first direction and to be emitted through the first mirror. The first photodetector is located on a path of light to be input to the optical waveguide layer or on another path branching off from the path and outputs a first signal according to an amount of received light. The second photodetector is located on a path of light that has propagated through the optical waveguide layer along the first direction and passed the optical waveguide layer and outputs a second signal according to an amount of received light.

According to the configuration, a direction and an intensity of light emitted from the waveguide element can be estimated on the basis of the first signal and the second signal. It is therefore possible to determine whether or not the direction and/or the intensity of the emitted light are appropriate on the basis of the first signal and the second signal and perform operation such as correction processing or error output as needed. This can provide a more reliable light emitting device.

The light emitting device may be configured to further include a control circuit that controls at least one of an intensity or a direction of emitted light emitted from the first mirror on the basis of the first signal and the second signal.

According to the configuration, in a case where at least one of an intensity or a direction of emitted light is different from a desired intensity or direction, the at least one of the intensity or the direction of the emitted light can be corrected. Note that the control circuit may be an external element independent of the light emitting device. In this case, the control circuit is used by being connected to the light emitting device.

The optical waveguide layer may contain a material whose refractive index changes in accordance with an applied voltage. The waveguide element may further include a pair of electrodes on both sides of the optical waveguide layer, respectively. The control circuit may control the direction of the emitted light by controlling a voltage applied to the pair of electrodes on the basis of the first signal and the second signal.

According to the configuration, in a case where a direction of emitted light estimated on the basis of the first signal and the second signal is different from a desired direction, the direction of the emitted light can be made appropriate by controlling a voltage applied to the pair of electrodes.

The light emitting device may further include a storage device in which data that defines a correspondence between a ratio of the first signal and the second signal and an emission angle of the emitted light is stored. The control circuit may decide the voltage by referring to the data.

According to the configuration, the control circuit can estimate an emission angle of light from the ratio of the acquired first signal and second signal by referring to the data recorded in advance. In a case where the estimated emission angle is deviated from a desired emission angle, it is therefore possible to compensate for the deviation of the emission angle by adjusting the voltage.

The optical waveguide layer may be made of a liquid crystal material. The data may define a correspondence between the ratio and the emission angle for each of a plurality of conditions that are different in light transmittance of the liquid crystal material. The light emitting device may further include a measurement device that measures the light transmittance of the liquid crystal material. The control circuit may decide the voltage on the basis of the first signal and the second signal, the measured light transmittance of the liquid crystal material, and the data.

According to the configuration, even in a case where light transmittance of the optical waveguide layer made of a liquid crystal material is changed from an initial value, for example, due to aging degradation, a light emission direction can be properly adjusted.

The light emitting device may further include a light source that emits the light to be input to the optical waveguide layer. The control circuit may control the intensity of the emitted light by controlling an intensity of the light emitted from the light source on the basis of the first signal and the second signal.

According to the configuration, in a case where the intensity of the emitted light is different from a desired intensity, the intensity of the emitted light can be made appropriate by adjusting an intensity of light emitted from the light source.

The light emitting device may further include a first optical waveguide that connects a light source that emits the light to be input to the optical waveguide layer and the optical waveguide layer. The first photodetector may detect light propagating through a path branching off from the first optical waveguide.

According to the configuration, an intensity of light to be input to the optical waveguide layer can be detected or estimated with a simple configuration. In the above configuration, the intensity of the light detected by the first photodetector is different from the intensity of the light to be input to the optical waveguide layer, but these intensities are substantially proportional to each other. Therefore, the intensity of the light to be input to the optical waveguide layer can be estimated from the intensity of the light detected by the first photodetector.

The light emitting device may further include a second optical waveguide that is connected to the optical waveguide layer on a side toward which light propagating through the optical waveguide layer travels. The second photodetector may detect light that has propagated through the second optical waveguide.

According to the configuration, an intensity of light that has passed the optical waveguide layer can be detected or estimated with a simple configuration.

A light emitting device according to another embodiment of the present disclosure includes a plurality of waveguide elements, a plurality of first optical waveguides, a light source, a first photodetector, and a second photodetector. Each of the plurality of waveguide elements includes a first mirror that is light transmissive, a second mirror that faces the first mirror, and an optical waveguide layer located between the first mirror and the second mirror, and allows light input to the optical waveguide layer to propagate along a first direction and to be emitted through the first mirror. The plurality of waveguide elements are aligned in a second direction crossing the first direction. The plurality of first optical waveguides are connected to the respective optical waveguide layers of the plurality of waveguide elements. The light source emits light to be input to the plurality of first optical waveguides. The first photodetector receives light at any point on a path from the light source to the plurality of waveguide elements and outputs a first signal according to an amount of received light. The second photodetector receives light that has propagated through the optical waveguide layers of the plurality of waveguide elements along the first direction and passed the optical waveguide layers and outputs a second signal according to an amount of received light.

According to the configuration, since the plurality of waveguide elements are provided, two-dimensional light scan can be realized in addition to the above effects.

The light emitting device may further include a control circuit that controls at least one of an intensity or a direction of emitted light emitted from the first mirror on the basis of the first signal and the second signal.

According to the configuration, in a case where at least one of an intensity or a direction of emitted light is different from a desired intensity or direction, the at least one of the intensity or the direction of the emitted light can be corrected.

The optical waveguide layer of each of the waveguide elements may contain a material whose refractive index changes in accordance with an applied voltage. Each of the waveguide elements may further include a pair of electrodes on both sides of the optical waveguide layer, respectively. The control circuit may control the direction of the emitted light by controlling a voltage applied to the pair of electrodes in each of the waveguide elements on the basis of the first signal and the second signal.

According to the configuration, in a case where a direction of emitted light estimated on the basis of the first signal and the second signal is different from a desired direction, the direction of the emitted light can be made appropriate by controlling a voltage applied to the pair of electrodes.

The control circuit may control the intensity of the emitted light by controlling an intensity of the light emitted from the light source on the basis of the first signal and the second signal.

According to the configuration, in a case where the intensity of the emitted light is different from a desired intensity, the intensity of the emitted light can be made appropriate by adjusting an intensity of light emitted from the light source.

The light emitting device according to the present disclosure can be widely used for uses that need emission of a light beam, for example, for uses such as a lidar system mounted on a vehicle such as an automobile, a UAV, or an AVGV.

What is claimed is:

1. A light emitting device comprising:
   a waveguide element including a first mirror that is light transmissive, a second mirror that faces the first mirror, and an optical waveguide layer located between the first mirror and the second mirror, the waveguide element allowing light input to the optical waveguide layer to propagate along a first direction and to be emitted through the first mirror;

a first photodetector that is located on a path of light to be input to the optical waveguide layer or on another path branching off from the path and outputs a first signal according to an amount of received light;
a second photodetector that is located on a path of light that has propagated through the optical waveguide layer along the first direction and passed the optical waveguide layer and outputs a second signal according to an amount of received light; and
a control circuit that controls at least one of an intensity or a direction of emitted light emitted from the first mirror on a basis of the first signal and the second signal, wherein:
the optical waveguide layer contains a material having a refractive index that changes in accordance with an applied voltage,
the waveguide element further includes a pair of electrodes on both sides of the optical waveguide layer, respectively,
the control circuit controls the direction of the emitted light by controlling a voltage applied to the pair of electrodes on a basis of the first signal and the second signal,
the light emitting device further comprises a storage device in which data that defines a correspondence between a ratio of the first signal and the second signal and an emission angle of the emitted light is stored, and
the control circuit determines the voltage by referring to the data.

2. The light emitting device according to claim 1, wherein the first photodetector is located at an input side of the optical waveguide layer of the waveguide element, and the second photodetector is located at an output side of the optical waveguide layer.

3. The light emitting device according to claim 1, wherein:
the optical waveguide layer comprises a liquid crystal material,
the data defines a correspondence between the ratio and the emission angle for each of a plurality of conditions that are different in light transmittance of the liquid crystal material,
the light emitting device further includes a measurement device that measures the light transmittance of the liquid crystal material, and
the control circuit determines the voltage on a basis of the first signal and the second signal, the measured light transmittance of the liquid crystal material, and the data.

4. The light emitting device according to claim 1, further comprising a light source that emits the light to be input to the optical waveguide layer,
wherein the control circuit controls the intensity of the emitted light by controlling an intensity of the light emitted from the light source on a basis of the first signal and the second signal.

5. The light emitting device according to claim 1, further comprising a first optical waveguide that connects a light source that emits the light to be input to the optical waveguide layer and the optical waveguide layer,
wherein the first photodetector detects light propagating through a path branching off from the first optical waveguide.

6. The light emitting device according to claim 1, further comprising a second optical waveguide that is connected to the optical waveguide layer on a side toward which light propagating through the optical waveguide layer travels,
wherein the second photodetector detects light that has propagated through the second optical waveguide.

7. A light emitting device comprising:
a plurality of waveguide elements each including a first mirror that is light transmissive, a second mirror that faces the first mirror, and an optical waveguide layer located between the first mirror and the second mirror, and allowing light input to the optical waveguide layer to propagate along a first direction and to be emitted through the first mirror, the plurality of waveguide elements being aligned in a second direction crossing the first direction;
a plurality of first optical waveguides connected to the respective optical waveguide layers of the plurality of waveguide elements;
a light source that emits light to be input to the plurality of first optical waveguides;
a first photodetector that receives light at any point on a path from the light source to the plurality of waveguide elements and outputs a first signal indicative of an amount of received light;
a second photodetector that receives light that has propagated through the optical waveguide layers of the plurality of waveguide elements along the first direction and passed the optical waveguide layers and outputs a second signal indicative of an amount of received light; and
a control circuit that controls at least one of an intensity or a direction of emitted light emitted from the first mirror on a basis of the first signal and the second signal, wherein:
the optical waveguide layers contain a material having a refractive index that changes in accordance with an applied voltage,
the plurality of waveguide elements further include a pair of electrodes on both sides of the optical waveguide layers, respectively,
the control circuit controls the direction of the emitted light by controlling a voltage applied to the pair of electrodes on a basis of the first signal and the second signal,
the light emitting device further comprises a storage device in which data that defines a correspondence between a ratio of the first signal and the second signal and an emission angle of the emitted light is stored, and
the control circuit determines the voltage by referring to the data.

8. The light emitting device according to claim 7, wherein the control circuit controls the direction of the emitted light by controlling a voltage applied to the pair of electrodes in each of the waveguide elements on a basis of the first signal and the second signal.

9. The light emitting device according to claim 7, wherein the control circuit controls the intensity of the emitted light by controlling an intensity of the light emitted from the light source on a basis of the first signal and the second signal.

10. The light emitting device according to claim 7, wherein the first photodetector is located at an input side of the optical waveguide layer of the plurality of waveguide elements, and the second photodetector is located at an output side of the optical waveguide layer.

* * * * *